United States Patent
Berestov et al.

(10) Patent No.: US 7,511,716 B2
(45) Date of Patent: Mar. 31, 2009

(54) HIGH-RESOLUTION MICRO-LENS 3D DISPLAY WITH SHARED SUB-PIXEL COLOR SIGNALS

(75) Inventors: Alexander Berestov, San Jose, CA (US); Chuen-Chien Lee, Pleasanton, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 307 days.

(21) Appl. No.: 11/117,824

(22) Filed: Apr. 29, 2005

(65) Prior Publication Data
US 2006/0244761 A1    Nov. 2, 2006

(51) Int. Cl.
G06T 15/00 (2006.01)
G09G 5/02 (2006.01)
G09G 5/36 (2006.01)
G02B 27/22 (2006.01)
H04N 13/00 (2006.01)

(52) U.S. Cl. ............ 345/613; 345/419; 345/589; 345/6; 345/690; 359/455; 359/458; 359/462; 359/310; 349/106; 349/108

(58) Field of Classification Search ........ 345/419, 345/426, 428, 581, 589, 600, 606–614, 593, 345/597, 204, 690, 694, 214, 6, 12, 22, 55, 345/63, 83–89, 103, 32; 359/308, 310, 337, 359/376, 462, 502; 348/560, 630, 760, 839
See application file for complete search history.

(56) References Cited

U.S. PATENT DOCUMENTS

| | | | |
|---|---|---|---|
| 3,409,351 A | 11/1968 | Winnek | |
| 4,886,343 A | 12/1989 | Johnson | |
| 5,341,153 A | 8/1994 | Benzschawel et al. | |
| 6,023,263 A | 2/2000 | Wood | |
| 7,239,363 B2 * | 7/2007 | Park et al. | 349/109 |
| 2002/0011969 A1 | 1/2002 | Lipton et al. | |

(Continued)

OTHER PUBLICATIONS

Wandell, B., "Fundamentals of Vision: Behavior, Neuroscience, and Computation", Society for Information Display, SID Short Course S-2, Jun. 12, 1994, pp. 1-56.
Elliot, C.H.B., "Active Matrix Display Layout Optimization for Subpixel Image Rendering," *Proceedings of the 1ˢ International Display Manufacturing Conference*, Sep. 2000, pp. 185-187.
D. ALleysson, et al."Color Demosaicing by Estimating Luminance and Opponent Chromatic Signals in the Frourier Domain", *Proc. IS&T/SID 10th Color Imaging Conference*, 2002, pp. 331-336.

*Primary Examiner*—Wesner Sajous
(74) *Attorney, Agent, or Firm*—Blakely, Sokoloff, Taylor & Zafman LLP

(57) ABSTRACT

In one embodiment, a sub-pixel rendering method includes receiving 3D image data associated with pixel intensity values of N two-dimensional images having multiple sets of corresponding pixels. Each set of corresponding pixels includes N pixels (one pixel from each of N images) and each pixel has a green sub-pixel, a red sub-pixel and a blue sub-pixel. The method further includes mapping, for each selected set, N green sub-pixels, N red sub-pixels and N blue sub-pixels to M sub-pixels on a display to form a stereogram of the scene. The above mapping includes mapping N green sub-pixels from N images to N green sub-pixels on the display, mapping N red sub-pixels from N images to L red sub-pixels on the display, and mapping N blue sub-pixels from N images to K blue sub-pixels on the display, where L does not exceed N and K is lower than N.

49 Claims, 20 Drawing Sheets
(13 of 20 Drawing Sheet(s) Filed in Color)

U.S. PATENT DOCUMENTS

| | | |
|---|---|---|
| 2002/0015110 A1 | 2/2002 | Brown Elliott |
| 2003/0011884 A1* | 1/2003 | Van Berkel ................. 359/464 |
| 2003/0034992 A1 | 2/2003 | Brown Elliott et al. |
| 2003/0085906 A1 | 5/2003 | Elliott et al. |
| 2003/0090581 A1 | 5/2003 | Credelle et al. |
| 2003/0103058 A1 | 6/2003 | Brown Elliott et al. |
| 2003/0117423 A1 | 6/2003 | Brown Elliott |
| 2003/0128179 A1 | 7/2003 | Credelle |
| 2003/0128225 A1 | 7/2003 | Credelle et al. |
| 2004/0051724 A1 | 3/2004 | Brown Elliott et al. |
| 2004/0080479 A1 | 4/2004 | Credelle |
| 2004/0174375 A1 | 9/2004 | Credelle et al. |
| 2004/0174380 A1 | 9/2004 | Credelle et al. |
| 2004/0196297 A1* | 10/2004 | Elliott et al. ................ 345/613 |
| 2004/0196302 A1 | 10/2004 | Im et al. |
| 2004/0246213 A1 | 12/2004 | Credelle et al. |
| 2004/0246278 A1 | 12/2004 | Elliott |
| 2004/0246279 A1 | 12/2004 | Credelle et al. |
| 2004/0246280 A1 | 12/2004 | Credelle et al. |
| 2004/0246381 A1 | 12/2004 | Crdelle |
| 2004/0246404 A1 | 12/2004 | Elliott et al. |
| 2005/0237450 A1* | 10/2005 | Hu et al. ..................... 349/108 |
| 2006/0012878 A1* | 1/2006 | Lipton et al. ................ 359/463 |
| 2007/0064020 A1* | 3/2007 | Credelle et al. ............. 345/694 |

* cited by examiner

ORIGINAL IMAGE 502

BLUE CHANNEL 504

ORIGINAL IMAGE WITH
BLURRED BLUE 510

BLURRED BLUE WITH THE
RADIUS OF 3 PIXELS 512

ORIGINAL IMAGE WITH BLURRED BLUE 520

BLUE BLURRED WITH THE RADIUS OF 9 PIXELS 522

ORIGINAL IMAGE 802　　　　BLUE BLURRED WITH THE
　　　　　　　　　　　　　RADIUS OF 9 PIXELS 804

ORIGINAL IMAGE WITH
BLURRED BLUE AND RED 810

RED BLURRED WITH THE
RADIUS OF 3 PIXELS 812

ORIGINAL IMAGE WITH
BLURRED BLUE AND RED 820

RED BLURRED WITH THE
RADIUS OF 5 PIXELS 822

ORIGINAL IMAGE 1102

LUMINANCE (L = (R+G+B)/3) 1104

CHROMINANCE BLURRED WITH
THE RADIUS OF 9 PIXELS 1110

CHROMINANCE R-L, G-L, B-L 1112

ORIGINAL IMAGE WITH BLURRED CHROMINANCE 1120

SAME WITH ADJUSTED BRIGHTNESS 1122

HIGH-RESOLUTION MICRO-LENS 3D DISPLAY WITH SHARED SUB-PIXEL COLOR SIGNALS

FIELD OF THE INVENTION

The invention relates to three-dimensional color displays. More particularly, the invention relates to three-dimensional color displays with shared sub-pixel color signals.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2005, Sony Electronics, Inc., All Rights Reserved.

BACKGROUND OF THE INVENTION

A micro-lens array screen or lens sheet technology (lenslets or miniature lenses arrayed on a flat sheets) have been in use for almost a century. In a United States patent granted in 1915, W. Hess used a corduroy-like vertical going lenticules that refract only in the horizontal direction. Hess also described a means to photograph left and right images and to then combine them optically into an interdigitated (slicing into strips and alternating the strips of left and right perspectives) micro-lens array stereogram. FIG. 1A explains how the Hess and similar systems work. The eyes of the viewer are indicated at R and L.

FIG. 1B illustrates a lenticular mask placed over a display that generates nine fields of view. Each lenticule in the lenticular mask covers nine vertical columns of pixels. In every field of view, one eye can see only one column of pixels. If we arrange nine digital cameras in a row, take nine pictures and display the n-th pixel column of the image taken with the first camera in the first column of pixels under the lenticule, the same pixel column taken with the second camera in the second column of pixels and so on, we can produce lenticular stereogram on the screen. Moving laterally across a viewing zone gives the look-around effect because each eye is seeing different images as a stereo pair. Moving out of one viewing zone into the next zone repeats the exact same perspective progression. Within a viewing zone, a viewer may see any two of nine views depending upon where you the viewer is located. Two views (e.g., views 1 and 4 or views 6 and 8) make a stereo pair.

Each resulting 3D image has one-ninth the resolution of the total horizontal resolution and the same vertical resolution. This unequal resolution in the x and y directions negatively impacts visual perception and causes an undesirable pattern composed of small dots (optical moiré) to appear in the image.

A more recent technique equalizes resolution in the x and y directions by using a different pixel layout of the display. In particular, this technique arranges the views in a tiled pattern of rectangles three by three, as illustrated in FIG. 1C. The micro-lens directs each of the sub-pixels into its viewing zone. Each 3D image has one-ninth the resolution of the total resolution (one third in each direction).

SUMMARY OF THE INVENTION

A method and apparatus for a three-dimensional (3D) display sub-pixel rendering is described. An exemplary 3D display sub-pixel rendering method includes receiving 3D image data associated with pixel intensity values of N two-dimensional (2D) images of a scene. N images have multiple sets of corresponding pixels. Each set of corresponding pixels includes N pixels (one pixel from each of N images) and each of N pixels has a green sub-pixel, a red sub-pixel and a blue sub-pixel. The method further includes mapping, for each selected set of corresponding pixels, N green sub-pixels, N red sub-pixels and N blue sub-pixels to M sub-pixels on a display to form a stereogram of the scene. The above mapping includes mapping N green sub-pixels from N images to N distinct green sub-pixels on the display, mapping N red sub-pixels from N images to L distinct red sub-pixels on the display, and mapping N blue sub-pixels from N images to K distinct blue sub-pixels on the display, where number L of red sub-pixels on the display does not exceed number N of green sub-pixels on the display and number K of blue sub-pixels on the display is lower than number N of green sub-pixels on the display.

BRIEF DESCRIPTION OF THE DRAWINGS

The patent or application file contains at least one drawing executed in color. Copies of this patent or patent publication with color drawing(s) will be provided by the Office upon request and payment of the necessary fee.

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

In the following detailed description of embodiments of the invention, reference is made to the accompanying drawings in which like references indicate similar elements, and in which is shown, by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
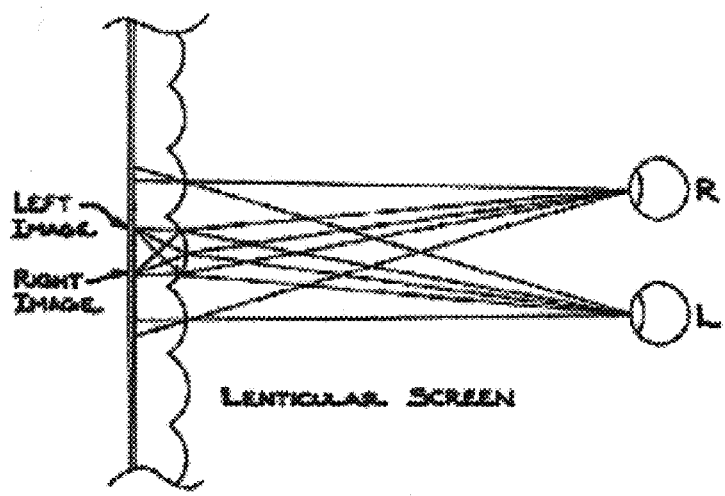
FIGS. 1A-1C illustrating prior art embodiments of micro-lens 3D displays.
Figure 1B:
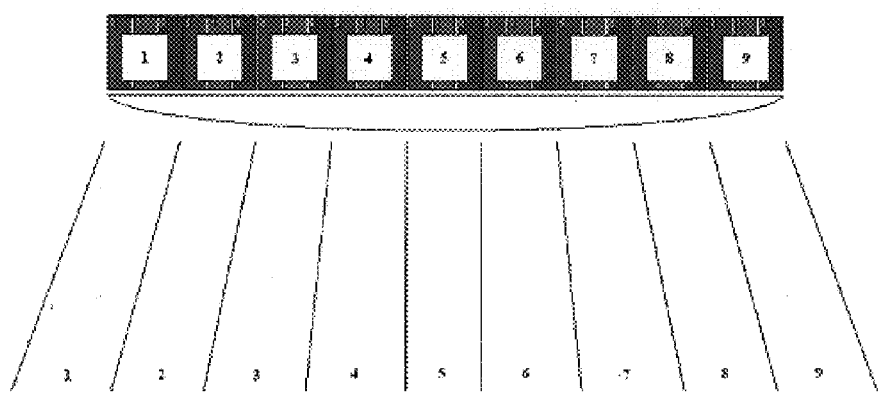
Figure 1C:
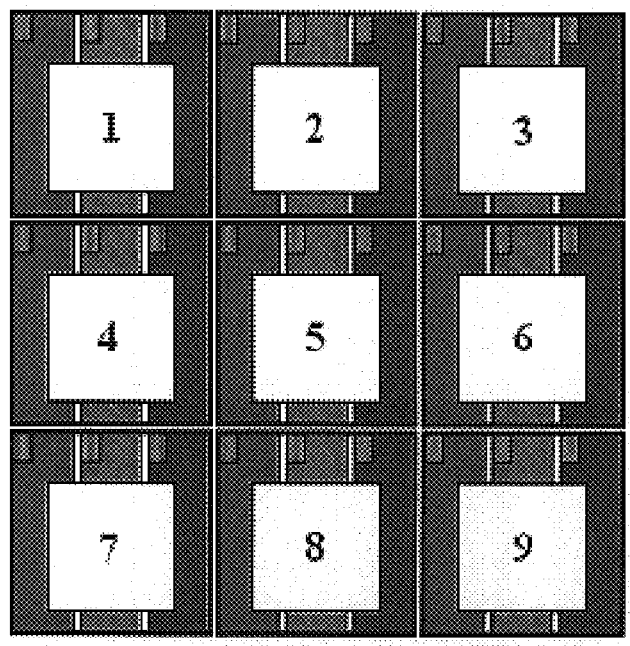
Figure 2:
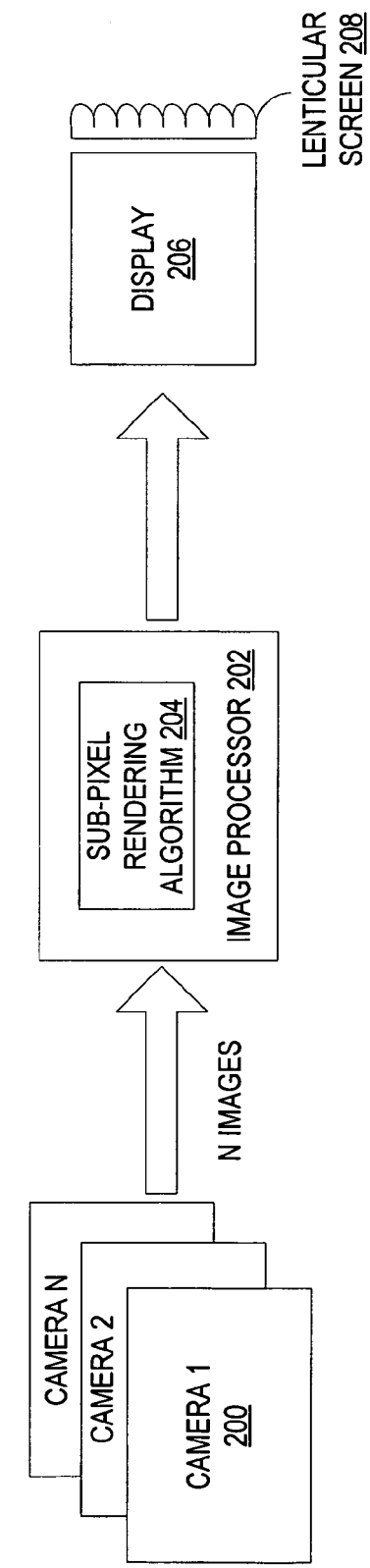
FIG. 2 is a block diagram of one embodiment of a 3D color display system.

Beginning with an overview of the operation of the invention, FIG. 2 illustrates one embodiment of a 3D color display system 200. The system 100 receives images of a scene from multiple cameras 200. A scene may include one or more objects (still or moving). Images may be taken from the real world or from a computer graphics virtual world. Alternatively, a single camera 200 may be moved along a straight line to produce multiple images of a still subject. Intermediate images may also be generated from a stereo pair with a computer application.

An image processor 202 receives the images and prepares them for display on a display 206. The display 206 may be, for example, a flat panel display, a liquid crystal display (LCD), a cathode ray-rube (CRT) monitor, etc. A lenticular screen or mask 208 is arranged in front of the display 206 to generate multiple fields of view. In one embodiment, the lenticular mask 208 directs display signals into multiple fields of view at a sub-pixel level to improve the quality of a stereo image, as will be discussed in more detail below.

In one embodiment, the image processor 202 includes a sub-pixel rendering algorithm 204 that maps sub-pixels of the images to sub-pixels of the display 206 and performs sub-pixel rendering according to the resulting sub-pixel map. As will be discussed in more detail below, in one embodiment, the display 206 has a color filter array layout resulting in increased resolution of the display.

In one embodiment, the color filter array layout of the display 206 is defined based on properties of the human vision system (HVS). The HVS is based on three color-receptor nerve cell types called cones that produce full color perception in the eye. The three types are sensitive to different wavelengths of light: long, medium, and short ("red," "green," and "blue" respectively). There are slightly more red receptors in the eye than green. There are also very few blue receptors compared to red and green, the ratio being 1 to 14 respectively. While in the fovea, the area that has the highest resolution capability, the number of blue receptors drops to less than one in twenty.

The HVS processes the information detected by the eye in several perceptual channels: luminance, chrominance, and motion. The luminance channel takes the input from the red and green cones combined, ignoring the blue. The chrominance channel is further divided into two sub-channels, the red-green opposition channel, and the yellow-blue opposition channel. The red and green colors combine to form the yellow that is opposed to the blue color.

The luminance channel resolution limit is approximately 50 cycles per degree in the horizontal axis, while the yellow-blue chrominance sub-channel resolution limit is 4 cycles per degree. Since saturated blue does not contribute to high-resolution images in human vision, reducing the number of blue pixels does not lower the image quality. In sub-pixel rendering the red and green sub-pixels each contribute to high-resolution images, but the blue sub-pixel does not. To put it simplistically, green sub-pixels are the most important, red sub-pixels are less important, and blue sub-pixels are not important.

Based on the above properties of the HVS, a color filter array layout is defined in which the number of blue sub-pixels is reduced, thus allowing to increase the resolution of the display. In particular, the color filter array layout is represented by multiple sub-pixel groups, with each sub-pixel group including N sets of color sub-pixels for a particular pixel from the source images. Number N is equal to the number of source images. In conventional displays, each sub-pixel group includes N green sub-pixels, N red sub-pixels and N blue sub-pixels.

In one embodiment, the number of blue sub-pixels in each sub-pixel group is reduced (e.g., from 9 to 3 or from 9 to 1), with each blue sub-pixel on the display corresponding to multiple blue sub-pixels from the source images. In one embodiment, a blue sub-pixel channel associated with one of the blue sub-pixels from the source images is blurred to cover all of the corresponding blue sub-pixels from the original images. For example, if a blue sub-pixel on the display corresponds to blue sub-pixels 1, 2 and 3 from the source images, the blue sub-pixel channel associated with sub-pixel 2 may be blurred to cover the blue sub-pixels 1, 2 and 3. Blurring may be performed using a filter such as an average filter or Gaussian filter.

In addition, positioning of the color sub-pixels on the display may be changed. For example, all green sub-pixels from a sub-pixel group may be positioned horizontally in one row and all red sub-pixels may be positioned in the next row below the corresponding green sub-pixels, forming a vertical pair of green and red sub-pixels of the same pixel. The reduced number of blue sub-pixels may be positioned underneath some of these pairs.

In another embodiment, the number of red sub-pixels in each sub-pixel group is also reduced (e.g., from 9 to 3 or from 9 to 2), in addition to the reduced number of blue sub-pixels, to further increase the resolution of the display. As a result, each red sub-pixel on the display corresponds to multiple red sub-pixels from the source images. In one embodiment, a red sub-pixel channel associated with one of the red sub-pixels from the source images is blurred to cover all of the corresponding red sub-pixels from the original images. In one embodiment, the number of red sub-pixels in each sub-pixel group is smaller than the number of green sub-pixels but larger than the number of blue sub-pixels in the sub-pixel group.

The positioning of color sub-pixels on the display may also be changed. For example, all green sub-pixels in the sub-pixel group may be positioned horizontally in one row, with the reduced number of red sub-pixels positioned in the next row, followed by the reduced number of blue sub-pixels.

Figure 3A:
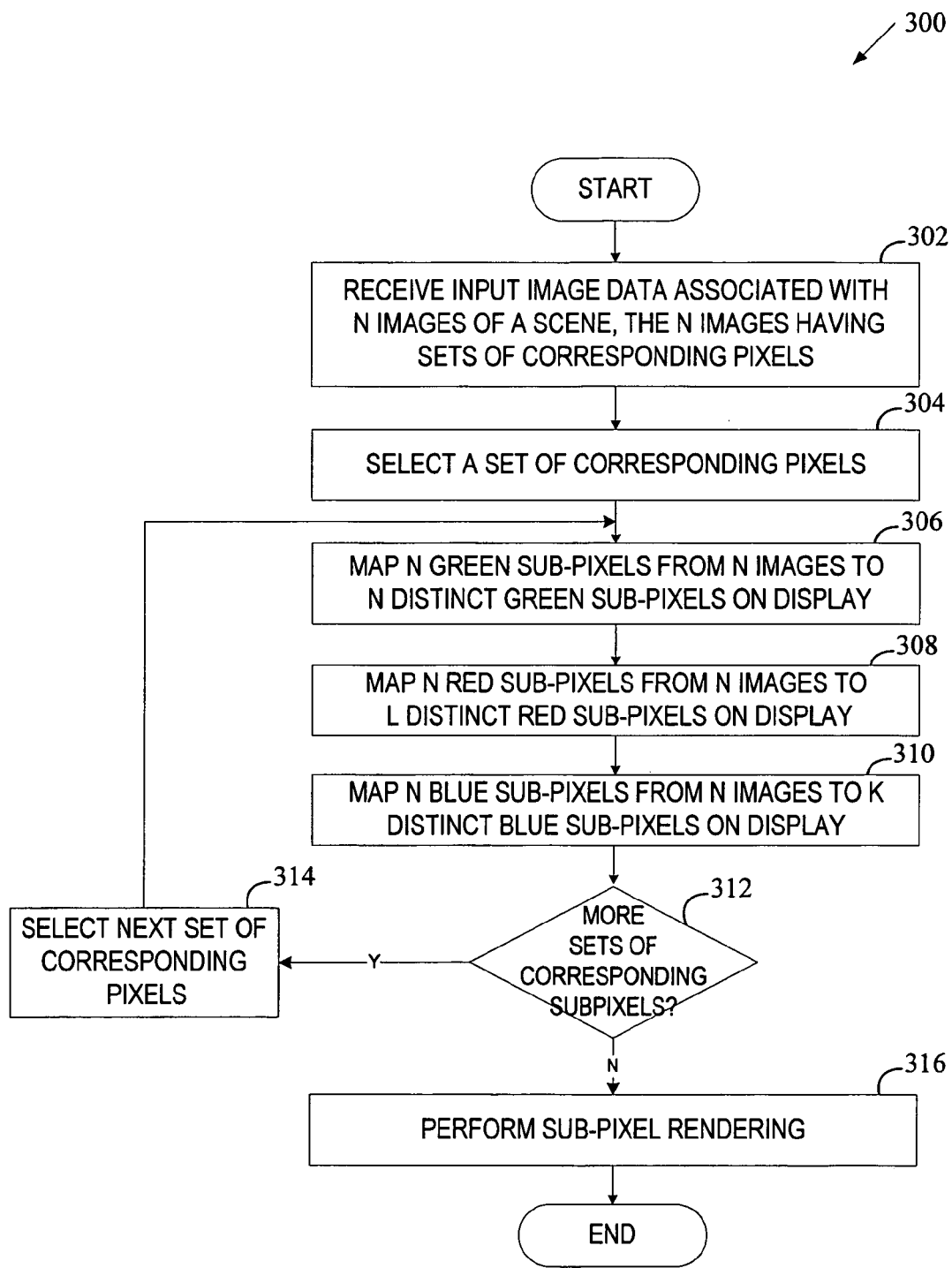
FIG. 3A is a flow diagram of one embodiment of a sub-pixel rendering process.

FIG. 3A is a flow diagram of one embodiment of a sub-pixel rendering process 300. Process 300 may be performed by a sub-pixel rendering algorithm 204 of FIG. 2. Process 300 may be performed by processing logic that may comprise hardware (e.g., circuitry, dedicated logic, etc.), software (such as run on a general purpose computer system or a dedicated machine), or a combination of both.

Referring to FIG. 3A, processing logic begins with receiving 3D input image data associated with N two-dimensional (2D) images of a scene that may include one or more objects (e.g., still or moving objects) (processing block 302). N images have multiple sets of corresponding N pixels (e.g., a set of pixels #1 from N images, a set of pixels #2 from N images, etc.). Each of N pixels in the set has a green sub-pixel, a red sub-pixel and a blue sub-pixel.

At processing block 304, processing logic selects a first set of corresponding pixels from N images (e.g., a set of pixels #1 from N images).

At processing block 306, processing logic maps N green sub-pixels from the set to N distinct green sub-pixels on the display.

At processing block 308, processing logic maps N red sub-pixels from the set to L distinct red sub-pixels on the display. In one embodiment, L is equal to N. Alternatively, L is smaller than N.

At processing block 310, processing logic maps N blue sub-pixels from the set to K distinct blue sub-pixels on the display. K is smaller than N (e.g., N=9 and K=3). Each blue sub-pixel on the display corresponds to at least two sub-pixels from the set.

If there are more unprocessed sets of corresponding sub-pixels (processing block 312), processing logic selects a next set of corresponding sub-pixels (processing block 314).

When all sets of corresponding sub-pixels from N images are processed, processing logic performs sub-pixel rendering using the resulting sub-pixel map (processing block 316).

In one embodiment, the display is overlaid by a lenticular mask that optically directs chrominance signals into N fields of view at a sub-pixel level.

Figure 3B:
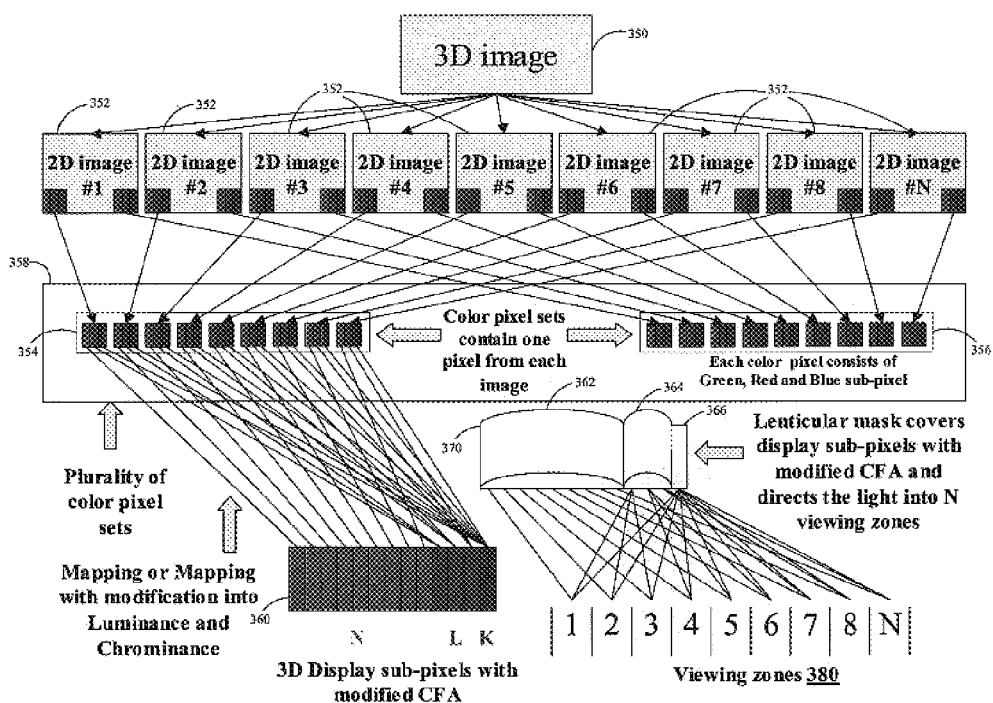
FIG. 3B illustrates one embodiment of a sub-pixel rendering process.

FIG. 3B illustrates one embodiment of a sub-pixel rendering process. As shown, the 3D image data 350 includes data of N 2D images 352 of a scene. Color pixels from the images 352 are combined into sets 358 (e.g., pixel set 354 and pixel set 356). Each pixel set 358 pertains to a single point of the scene includes one color pixel associated with this point from each image 352. Hence, each pixel set 358 contains N corresponding color pixels from N images 352. Each color pixel includes 3 sub-pixels: a green sub-pixel, a red-sub-pixel and a blue sub-pixel.

The sub-pixel rendering process (e.g., process 300) maps sub-pixels from each pixel set 358 to sub-pixels of a 3D display 360. The 3D display 360 has a color filter array (CFA) with a modified layout as discussed above. A single sub-pixel from a pixel set 358 may be mapped to a corresponding sub-pixel on the 3D display 360. Alternatively, a group of multiple sub-pixels from a sub-pixel set 358 may be processed and mapped to a single sub-pixel on the 3D display 360 based on the layout of the CFA. Processing a group of multiple sub-pixels from a sub-pixel set 358 may include, for example, selecting one sub-pixel in the group and mapping the selected sub-pixel to a sub-pixel on the 3D display 360 while ignoring the other sub-pixels in the group. Alternatively, a sub-pixel channel associated with one sub-pixel from the group may be blurred to cover all the sub-pixels in the group. The processing of the group of sub-pixels may consist of various other techniques such as brightening of a signal associated with a selected sub-pixel, etc.

The 3D display 360 is overlaid by a lenticular mask 370 that covers display sub-pixels and directs the light into N viewing zone 380. The lenticular mask 370 includes various micro-lenses that cover different number of sub-pixels. For example, a micro-lens 362 covers N sub-pixels and directs a signal associated with each of N sub-pixels into one of N viewing zones 380. Alternatively, a micro-lens 364 covers a number of sub-pixels that is smaller than N (e.g., 3 for N=9) and directs a signal associated with each covered sub-pixel into two or more of N viewing zones (e.g., 3 viewing zones) such that the signals associated with all covered sub-pixels are directed into N viewing zones.

The lenticular mask may also include a flat area 366 covering a single sub-pixel that can be viewed from any of N viewing zones.

The lenticular mask may have vertical or angled lenticules of different shapes and sizes. As discussed above, the lenticular mask may include lenticules that each can cover a single color sub-pixel, directing this color sub-pixel into one of N field of view. In one embodiment, the lenticular mask also includes lenticules that each can cover several sub-pixels of the same color, directing them into N fields of view, where N may be the same as the number of covered sub-pixels or larger than the number of covered sub-pixels. In one embodiment, the lenticular mask also includes lenticules that each can cover a set of pairs of color sub-pixels, directing the set into N fields of view, where each pair consists of a first color sub-pixel (e.g., green sub-pixel) and a second color sub-pixel (e.g., red sub-pixel). In one embodiment, the lenticular mask also includes lenticules that each can cover a single pair of such color sub-pixels, directing the pair into one of N fields of view.

Figure 3C:
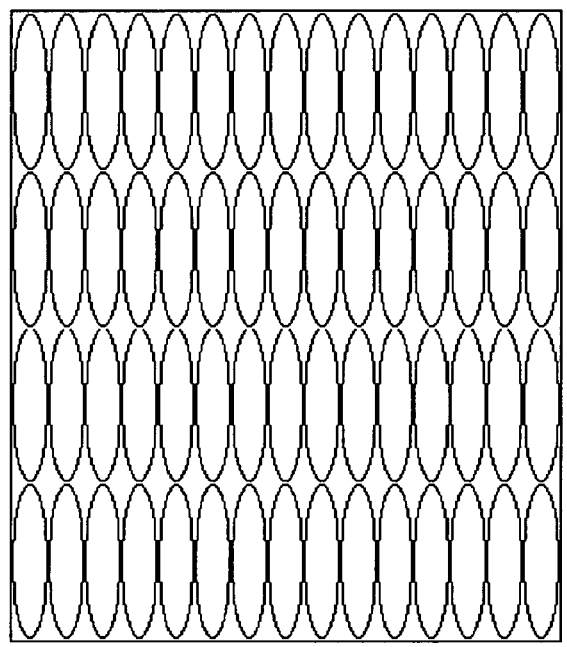
FIGS. 3C-3F illustrate exemplary structures of lenticular masks.

FIGS. 3C-3F illustrate exemplary structures of lenticular masks. Referring to FIG. 3C, a lenticular mask 382 includes miniature lenses arrayed on a flat sheet. Each lens covers one color sub-pixel and directs the light from this sub-pixel into one or several of the viewing zones. Every micro lens may have a different shape.

Figure 3D:
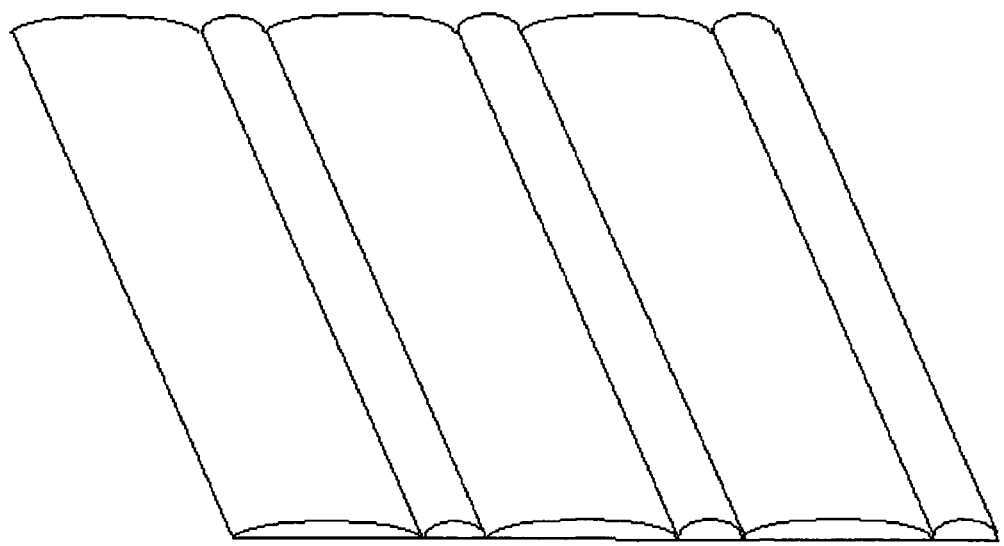

Referring to FIG. 3D, a lenticular mask 384 includes angled lenticules of different sizes.

Figure 3E:
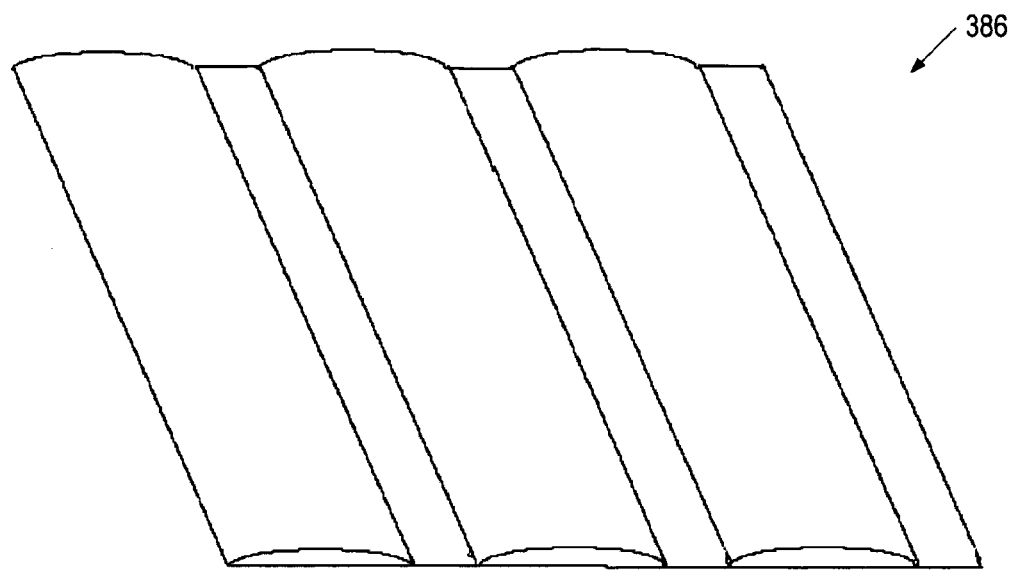

Referring to FIG. 3E, a lenticular mask 386 includes angled lenticules and flat areas. Each flat area can be seen from any viewing zone.

Figure 3F:
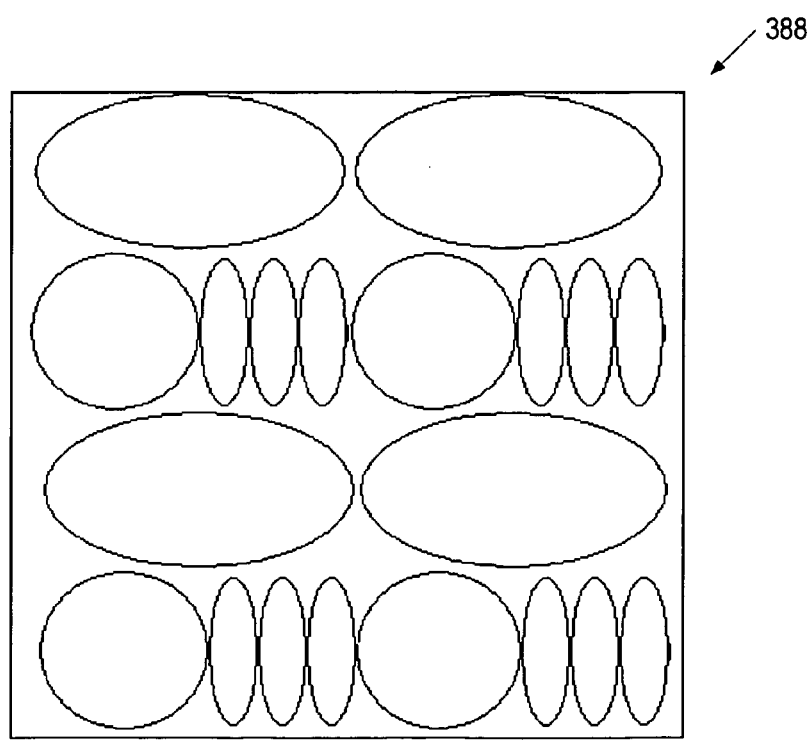

Referring to FIG. 3F, a lenticular mask 388 includes miniature lenses arrayed on a flat sheet. Each micro-lens covers one or several color sub-pixels and directs the light from each sub-pixel or sub-pixel group into one or several of the viewing zones. Every micro lens may have a different shape.

In an alternative embodiment, the 3D display may not be overlaid by a lenticular mask with a flat sheet connecting lenses to each other. Instead, each sub-pixel or group of sub-pixels on the 3D display may have an individual lens attached to this sub-pixel or group separately.

Exemplary display color filter layouts with a shared blue signal will now be discussed in more detail in conjunction with FIGS. 4A and 4B.

Figure 4A:
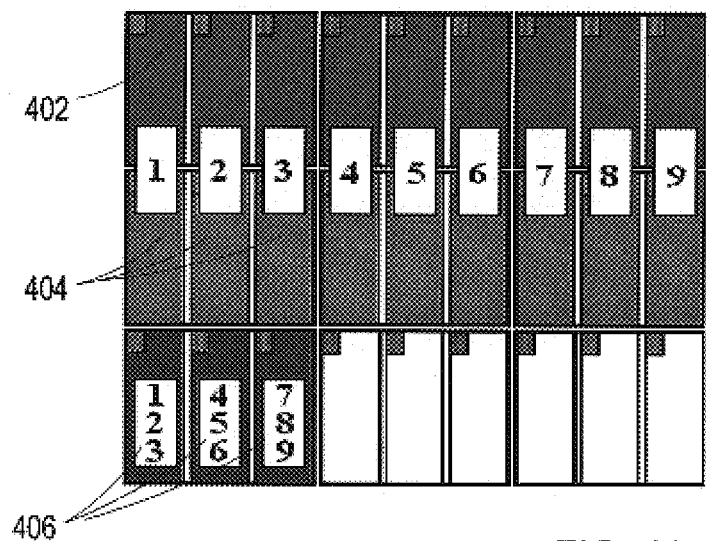
FIGS. 4A and 4B illustrate exemplary display color filter layouts utilizing a shared blue signal.

Referring to FIG. 4A, a color filter layout for a display of a 9-field 3D image is illustrated, in which the number of red sub-pixels 402 and green sub-pixels 404 remains the same while the number of blue sub-pixels 406 is reduced from 9 to 3. As result, only 7 pixels are required to display the 9-field 3D image.

One lenticule (e.g., in a lenticular mask of FIG. 3C or 3D) covers all red sub-pixels 402 and green sub-pixels 404, directing them into 9 fields of view. Blue sub-pixels 406 are covered with a different micro-lens, which directs 3 blue sub-pixels 406 into 9 fields of view by directing each individual blue sub-pixel 406 into 3 viewing fields. For a blue sub-pixel (1, 2, 3), a blue sub-pixel channel associated with the blue sub-pixel from image #2 is blurred to cover blue sub-pixels from all three images 1, 2 and 3. Similar blur is applied to the other two blue sub-pixels.

Figure 4B:
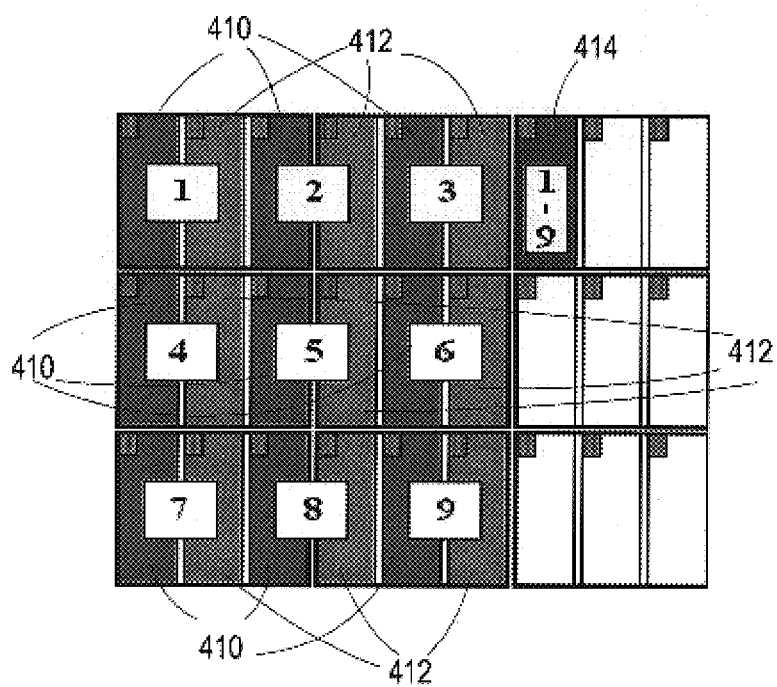

Referring to FIG. 4B, a color filter layout for a display of a 9-field 3D image is illustrated, in which the number of red sub-pixels 410 and green sub-pixels 412 remains the same while the number of blue sub-pixels 414 is reduced from 9 to 1. As a result, only 6 pixels and 1 sub-pixel are required to display the 9-field 3D image.

Each pair of a red sub-pixel 410 and a green sub-pixel 412 has its own micro-lens (e.g., in a lenticular mask of FIG. 3C), directing the pair into one of 9 fields of view. Blue sub-pixel 414 is not covered by a micro-lens and can be seen from anywhere. Blue sub-pixel 414 may contain 9 overlapped blue channels that can be blurred and brightened to improve image quality.

Figure 5A:
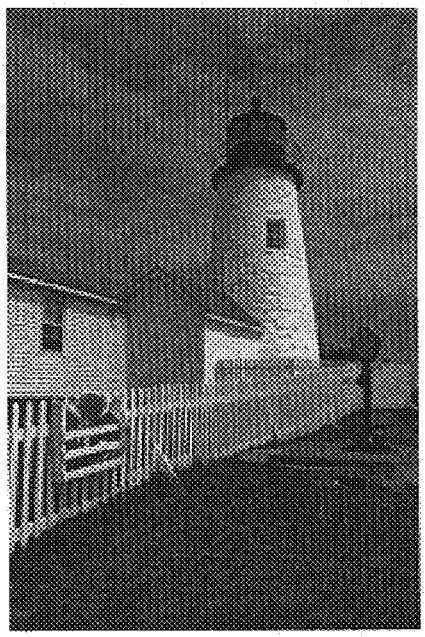
FIGS. 5A-5C illustrate exemplary images simulating display color filter layouts of FIGS. 4A and 4B.
Figure 5A:
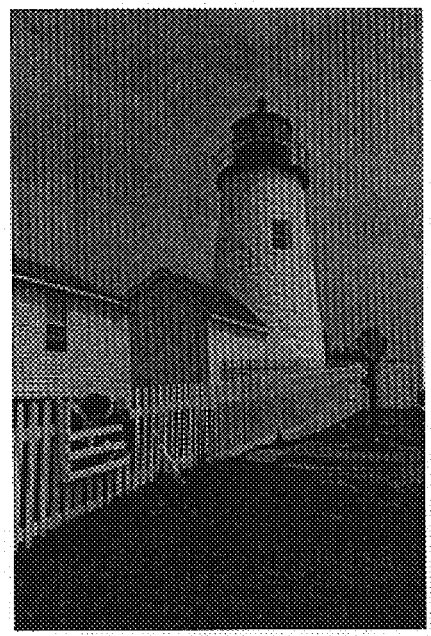
Figure 5B:
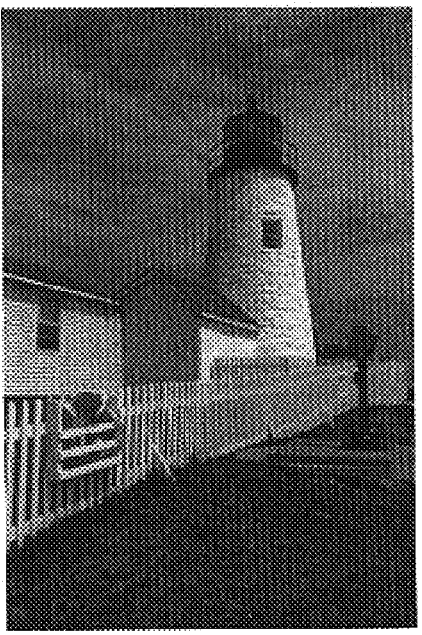
Figure 5B:
Figure 5C:
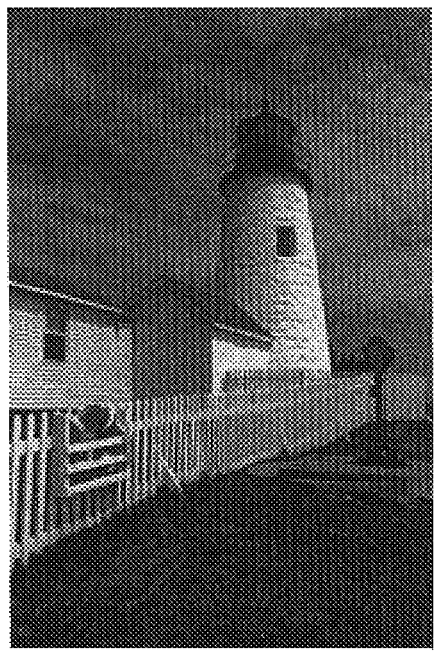
Figure 5C:
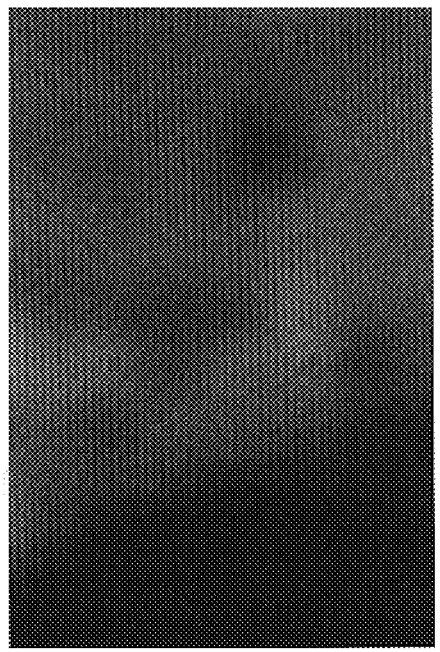

FIGS. 5A-5C illustrate exemplary images produced using the above arrangements of color filter layouts and lenticules.

FIG. 5A illustrates image 502 that was produced using conventional means. Image 504 was produced using only a blue color channel.

FIG. 5B illustrates image 512 produced using only a blue color channel, with the blue color channel blurred with the radius of 3 pixels. Image 510 was produced using green and red color channels, as well as a blue channel blurred with the radius of 3 pixels.

FIG. 5C illustrates image 522 produced using only a blue color channel, with the blue color channel blurred with the radius of 9 pixels. Image 520 was produced using green and red color channels, as well as a blue channel blurred with the radius of 9 pixels.

As illustrated, there are some minor color artifacts in images 510 and 520. However, the edges are sharp, and therefore a good stereo image will be seen within the viewing zones.

It should be understood by one of ordinary skill in the art that various other color sub-pixel layouts utilizing a shared blue signal can be used for 3D displays without loss of generality.

Figure 6:
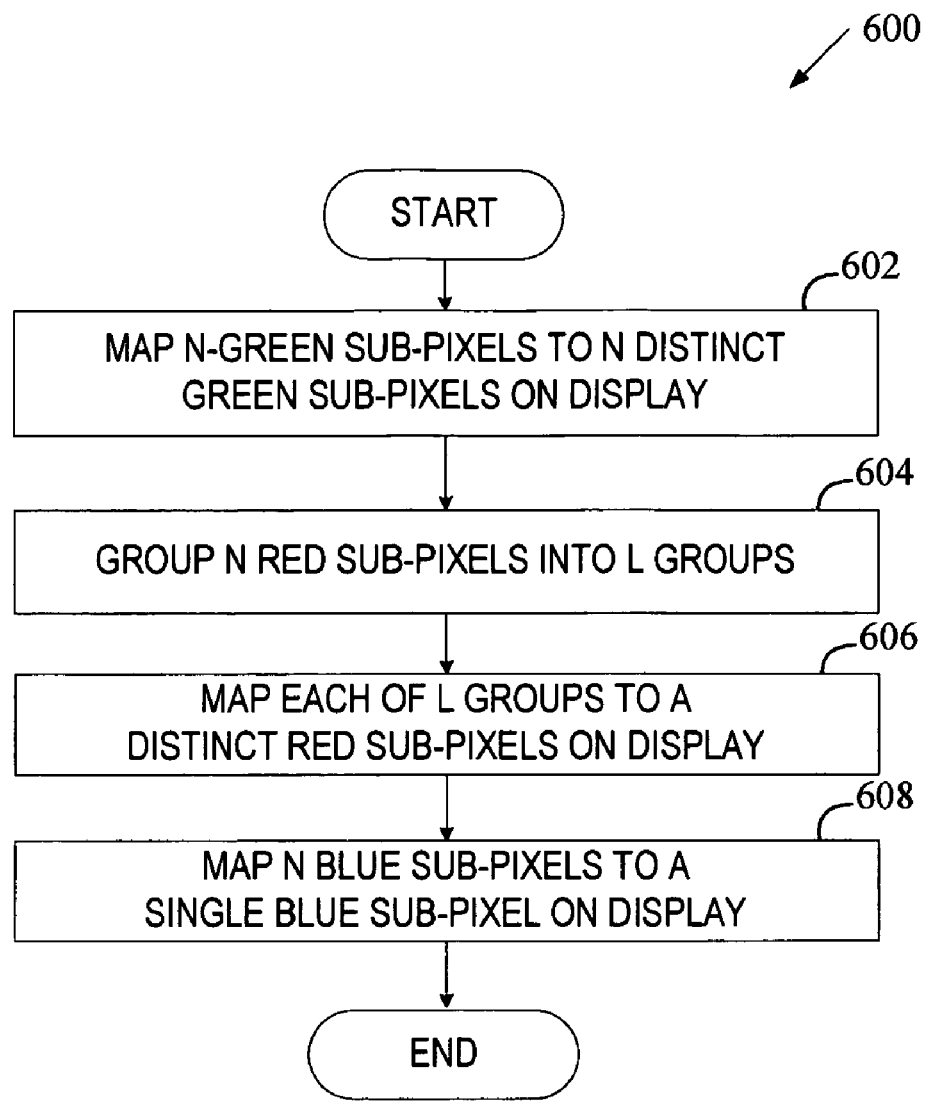
FIG. 6 is a flow diagram of one embodiment of a sub-pixel mapping process utilizing shared blue and red sub-pixel signals.

As discussed above, in an alternative embodiment, the number of red sub-pixels is also reduced in the color filter array layout of the display to further increase the resolution of the 3D image. FIG. 6 is a flow diagram of one embodiment of a sub-pixel mapping process 600 utilizing shared blue and red sub-pixel signals. Process 600 may be performed by a sub-pixel rendering algorithm 204 of FIG. 2. Process 600 may be performed by processing logic that may comprise hardware (e.g., circuitry, dedicated logic, etc.), software (such as run on a general purpose computer system or a dedicated machine), or a combination of both.

Referring to FIG. 6, processing logic begins with mapping N green sub-pixels from a selected set of corresponding sub-pixels to N distinct green sub-pixels on the display (processing block 602).

At processing block 604, processing logic groups N red sub-pixels into L groups, with each of L groups having two or more red sub-pixels from the set.

At processing block 606, processing logic maps each of L groups to L distinct red sub-pixels on the display.

At processing block 608, processing logic maps N blue sub-pixels from the set to a single blue sub-pixel on the display.

Exemplary display color filter layouts with shared blue and red signals will now be discussed in more detail in conjunction with FIGS. 7A and 7B.

Figure 7A:
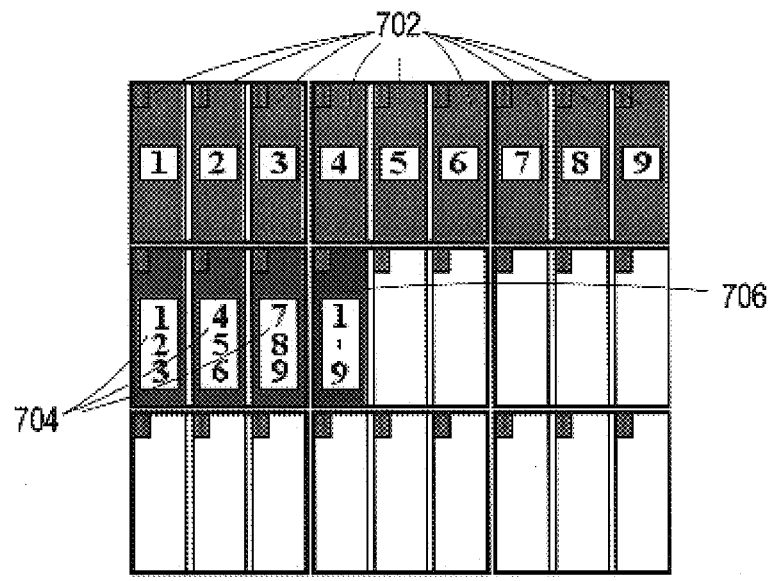
FIGS. 7A and 7B illustrate exemplary display color filter layouts utilizing shared blue and red signals.

Referring to FIG. 7A, a color filter layout for a display of a 9-field 3D image is illustrated, in which the number of green sub-pixels 702 remains the same while the number of red sub-pixels 704 is reduced from 9 to 3 and the number of blue sub-pixels 906 is reduced from 9 to 1. As a result, only 4 pixels and 1 sub-pixel are required to display the 9-field 3D image.

One lenticule (e.g., in a lenticular mask of FIG. 3C) covers all green sub-pixels 404, directing them into 9 fields of view. Red sub-pixels 704 are covered with a different micro-lens, which directs 3 red sub-pixels 704 into 9 fields of view by directing each individual red sub-pixel 704 into 3 viewing fields. For a red sub-pixel (1, 2, 3), a red sub-pixel channel associated with the red sub-pixel from image #2 is blurred to cover red sub-pixels from all three images 1, 2 and 3. Similar blur is applied to the other two red sub-pixels. Blue sub-pixel 706 is not covered by any micro-lens and can be viewed from anywhere. Blue sub-pixel 706 may contain 9 overlapped blue channels that can be blurred and brightened to improve image quality.

Figure 7B:
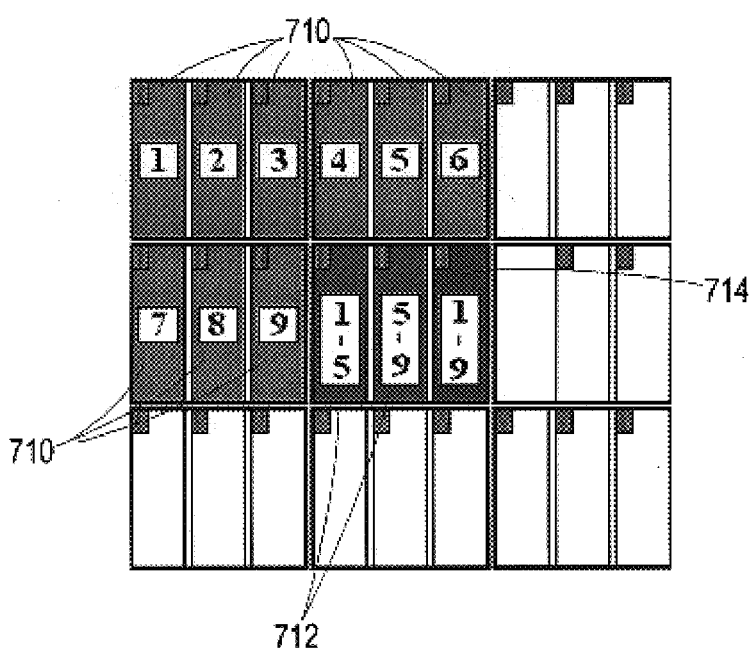

Referring to FIG. 7B, a color filter layout for a display of a 9-field 3D image is illustrated, in which the number of green sub-pixels 710 remains the same while the number of red sub-pixels 712 is reduced from 9 to 2 and the number of blue sub-pixels 712 is reduced from 9 to 1. As a result, only 4 pixels are required to display the 9-field 3D image.

Each green sub-pixel 710 has its own micro-lens (e.g., in a lenticular mask of FIG. 3C or 3F), directing it into one of 9 fields of view. Red sub-pixels 712 are covered with a different micro-lens, which directs 2 red sub-pixels 712 into 9 fields of view by directing each individual red sub-pixel 712 into 5 viewing fields. For a red sub-pixel (1-5), a red sub-pixel channel associated with the red sub-pixel from image #3 is blurred to cover red sub-pixels from all five images 1, 2, 3, 4 and 5. Similar blur is applied to the other red sub-pixel. Blue sub-pixel 714 is not covered by any micro-lens and can be viewed from anywhere. Blue sub-pixel 714 may contain 9 overlapped blue channels that can be blurred and brightened to improve image quality.

Figure 8A:
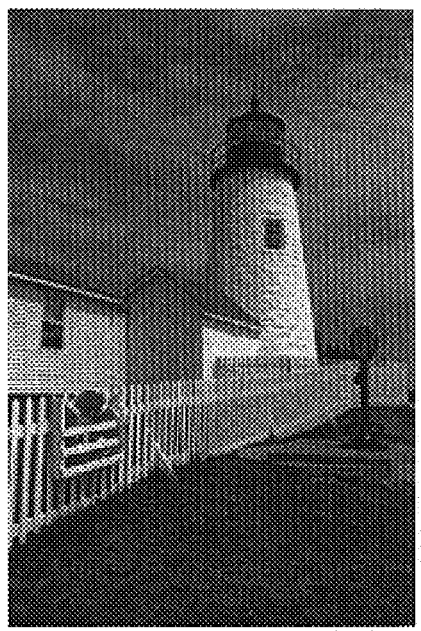
FIGS. 8A-8C illustrate exemplary images simulating display color filter layouts of FIGS. 7A and 7B.
Figure 8A:
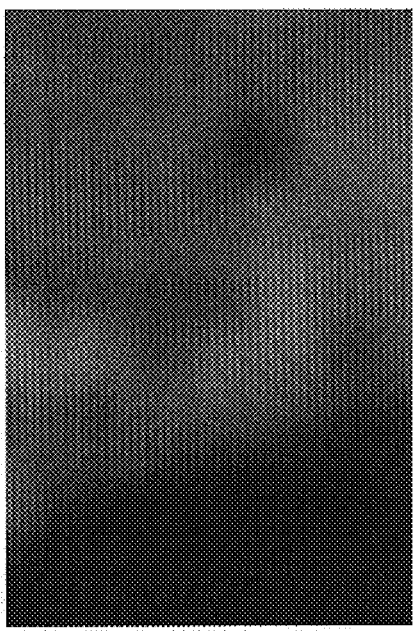
Figure 8B:
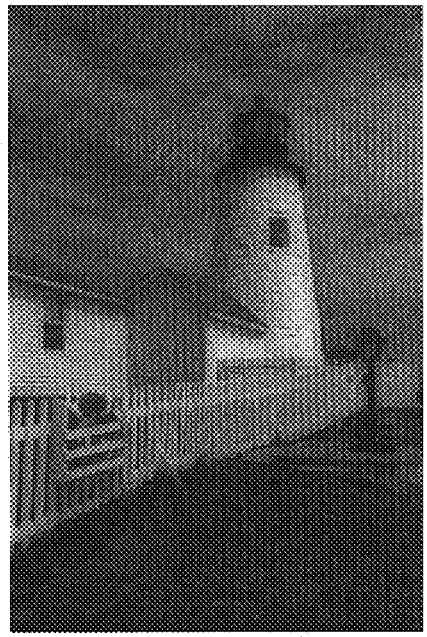
Figure 8B:
Figure 8C:
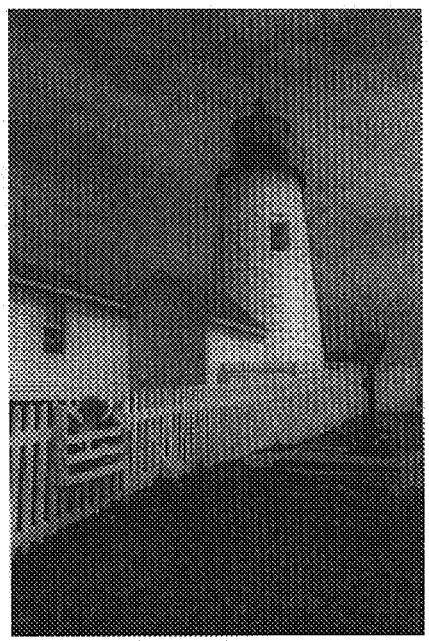
Figure 8C:

FIGS. 8A-8C illustrate images produced using the arrangements of color filter layouts and lenticules as discussed above in conjunction with FIGS. 7A and 7B.

FIG. 8A illustrates image 802 that was produced using conventional means. Image 804 was produced using only a blue color channel, with the blue color channel blurred with the radius of 9 pixels.

FIG. 8B illustrates image 812 produced using only a red color channel, with the red color channel blurred with the radius of 3 pixels. Image 810 was produced using a green color channel, as well as a red color channel blurred with the radius of 3 pixels and a blue color channel blurred with the radius of 9 pixels.

FIG. 8C illustrates image 822 produced using only a red color channel, with the red color channel blurred with the radius of 5 pixels. Image 820 was produced using a green color channel, as well as a red color channel blurred with the radius 5 pixels and a blue color channel blurred with the radius of 9 pixels.

As can be seen, while there are some minor color artifacts in images 810 and 820, the edges are sharp, and therefore a good stereo image will be seen within the viewing zones.

It should be understood by one of ordinary skill in the art that various other color sub-pixel layouts utilizing shared red and blue signals can be used for 3D displays without loss of generality.

In another embodiment, a color filter array layout is defined in which the number of green sub-pixels is reduced, as well as the number of red and blue sub-pixels. In particular, the color filter array layout is represented by multiple sub-pixel groups, with each sub-pixel group including, for a particular pixel from the source images, N grayscale sub-pixels, one green sub-pixel, one red sub-pixel and one blue sub-pixel. Number N is equal to the number of source images.

In one embodiment, the green sub-pixel contains N overlapped green sub-pixel channels blurred and modified to improve the image quality. Similarly, the red sub-pixel may contain N overlapped red sub-pixel channels blurred and modified to improve the image quality, and the blue sub-pixel may contain N overlapped blue sub-pixel channels blurred and modified to improve the image quality.

The positioning of sub-pixels on the display may change. For example, in a sub-pixel group, N grayscale sub-pixels may be positioned horizontally in one row and the green, red and blue sub-pixels may be positioned in the next row.

Figure 9:
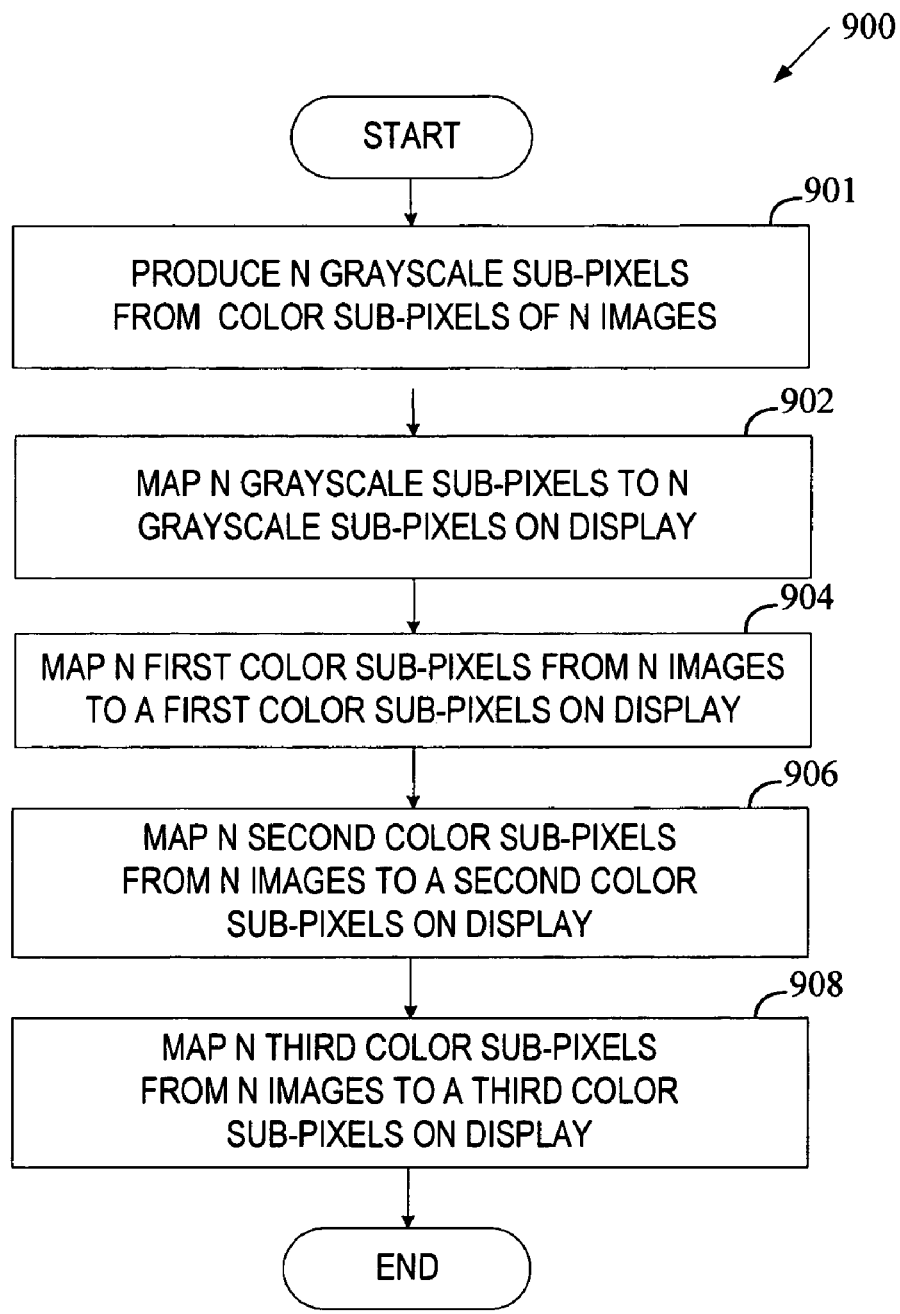
FIG. 9 is a flow diagram of one embodiment of a sub-pixel mapping process utilizing shared chrominance signals.

FIG. 9 is a flow diagram of one embodiment of a sub-pixel mapping process 900 utilizing shared chrominance signals. Process 900 may be performed by a sub-pixel rendering algorithm 204 of FIG. 2. Process 900 may be performed by processing logic that may comprise hardware (e.g., circuitry, dedicated logic, etc.), software (such as run on a general purpose computer system or a dedicated machine), or a combination of both.

Referring to FIG. 9, processing logic begins with producing N grayscale sub-pixels for a selected set of corresponding pixels from N images (processing block 901). Each grayscale sub-pixel is produced using 3 color sub-pixels of a relevant pixel in the set. In particular, a grayscale sub-pixel is produced by calculating a grayscale intensity value based on intensity values of 3 color sub-pixels of a relevant pixel. For example, a grayscale intensity value L corresponding to a grayscale sub-pixel may be calculated using the following expression:

$L=(R+G+B)/3$, where R is an intensity value of a red sub-pixel of a relevant pixel, G is an intensity value of a green sub-pixel of the relevant pixel, and B is an intensity value of a blue sub-pixel of the relevant pixel.

At processing block 902, processing logic maps N grayscale sub-pixels produced for the selected set of corresponding image pixels to N distinct grayscale sub-pixels on the display (processing block 902).

At processing block 904, processing logic maps N sub-pixels of first color (e.g., green) from the set to one or more first color sub-pixels on the display.

At processing block 906, processing logic maps N sub-pixels of second color (e.g., red) from the set to one or more second color sub-pixels on the display.

At processing block 908, processing logic maps N sub-pixels of third color (e.g., blue) from the set to one or more third color sub-pixels on the display.

In one embodiment, the display is overlaid by a lenticular mask that optically directs the luminance signals into N fields of view at a sub-pixel level, thus improving the quality of the resulting stereo image. The lenticular mask includes lenticules that each can cover a single grayscale sub-pixel, directing the signal of this sub-pixel into one of N field of view. In one embodiment, the lenticular mask also includes lenticules that each can cover several grayscale sub-pixels, directing them into N fields of view, where N may be the same as the number of covered sub-pixels or larger than the number of covered sub-pixels.

Exemplary display color filter layouts with shared chrominance signals will now be discussed in more detail in conjunction with FIGS. 10A and 10B.

Figure 10A:
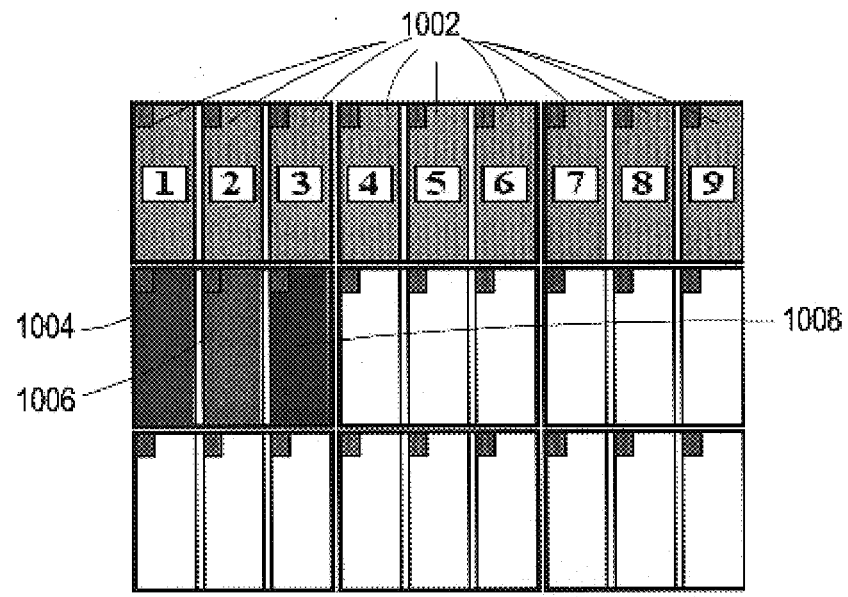
FIGS. 10A and 10B illustrate exemplary display color filter layouts utilizing shared chrominance signals.

Referring to FIG. 10A, a color filter layout for a display of a 9-field 3D image is illustrated, in which the number of grayscale sub-pixels 1010 is equal to 9 (the number of source images) while the number of green sub-pixels 1006 is reduced from 9 to 1, the number of red sub-pixels 1004 is reduced from 9 to 1 and the number of blue sub-pixels 1008 is reduced from 9 to 1. As result, only 4 pixels are required to display the 9-field 3D image.

One lenticule (e.g., in a lenticular mask of FIG. 3C or 3E) covers all grayscale sub-pixels 1002, directing them into 9 fields of view. Color sub-pixels 1004, 1006 and 1008 are not covered by any micro-lens and can be viewed from anywhere. Each color sub-pixel may contain 9 overlapped chrominance channels that can be blurred and brightened to improve image quality.

Figure 10B:
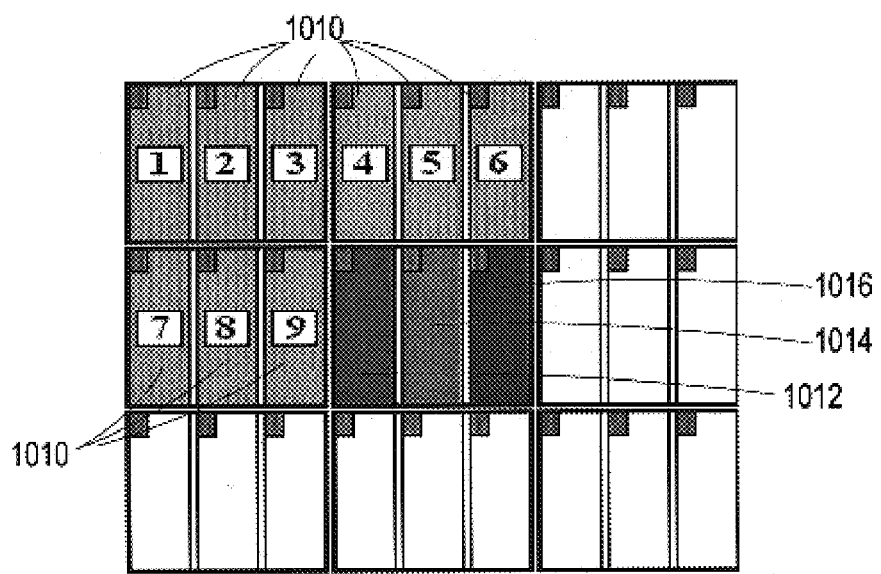

Referring to FIG. 10B, a color filter layout for a display of a 9-field 3D image is illustrated, in which the number of grayscale sub-pixels 1010 is equal to the number of source images while the number of green sub-pixels 1014 is reduced from 9 to 1, the number of red sub-pixels 1012 is reduced from 9 to 1 and the number of blue sub-pixels 1016 is reduced from 9 to 1. As result, only 4 pixels are required to display the 9-field 3D image.

Each grayscale sub-pixel 1010 has its own micro-lens (e.g., in a lenticular mask of FIG. 3C), directing the sub-pixel into one of 9 fields of view. Color sub-pixels 1012, 1014 and 1016 are not covered by any micro-lens and can be viewed from anywhere. Each color sub-pixel may contain 9 overlapped chrominance channels that can be blurred and brightened to improve image quality.

Figure 11A:
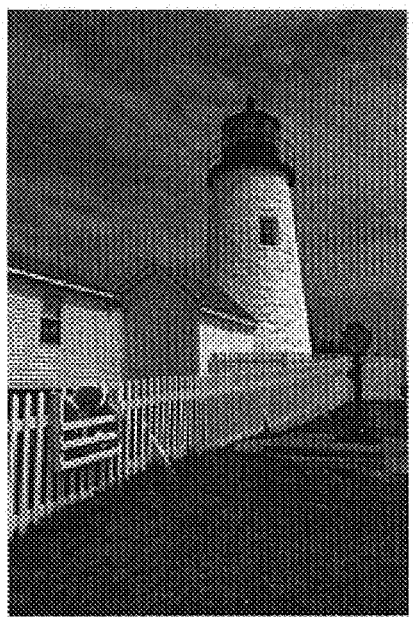
FIGS. 11A-11C illustrate exemplary images simulating display color filter layouts of FIGS. 10A and 10B.
Figure 11A:
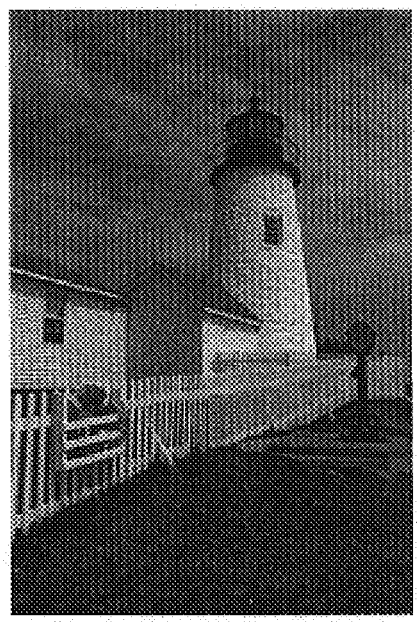
Figure 11B:
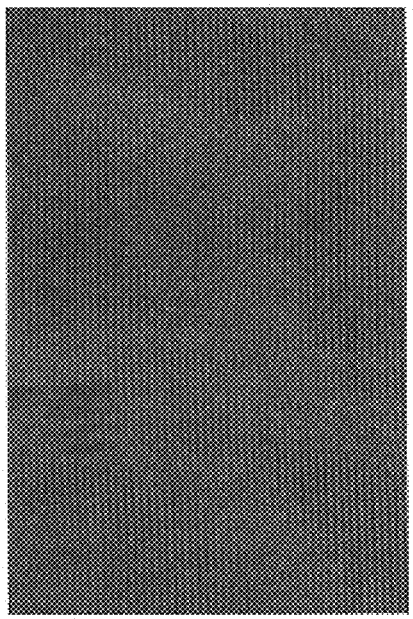
Figure 11B:
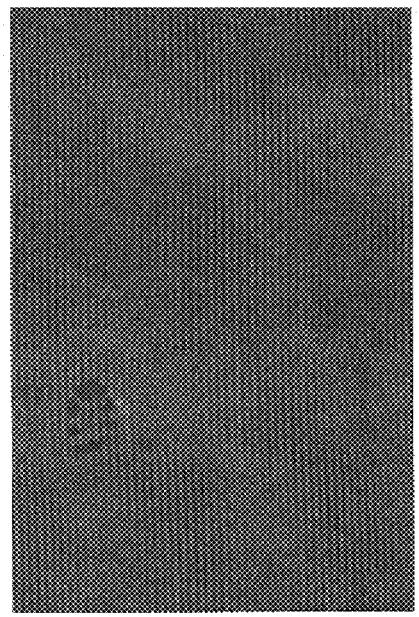
Figure 11C:
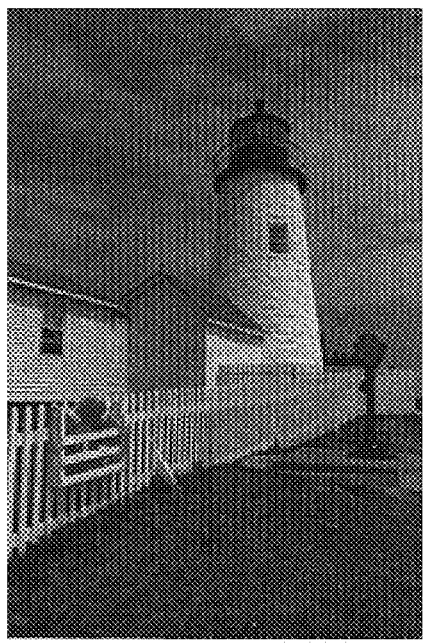
Figure 11C:
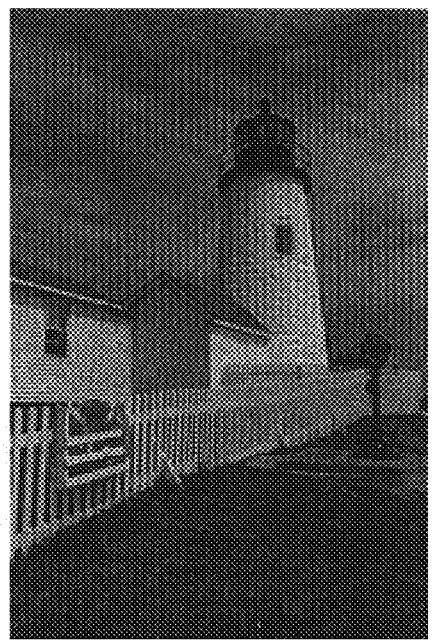

FIGS. 11A-11C illustrate images produced using the arrangements of color filter layouts and lenticules as discussed above in conjunction with FIGS. 10A and 10B.

FIG. 11A illustrates image 1102 that was produced using conventional means. Image 1104 was produced using only a luminance channel, with the grayscale intensity value calculated as $L=(R+G+B)/3$, where R, G and B are intensity values of a red channel, a green channel and a blue channel respectively.

FIG. 11B illustrates image 1112 produced using red, green and blue channels, with chrominance intensity values calculated as R-L, G-L and B-L respectively. Image 1110 was produced using chrominance intensity values blurred with the radius of 9 pixels. FIG. 11C illustrates the original image 1120 with blurred chrominance intensity values. Image 1122 is produced as the image 1120 but with adjusted brightness. As can be seen, there are almost no minor color artifacts in images 1110 and 1120, and the edges are sharp. Therefore, a good stereo image will be seen within the viewing zones.

It should be understood by one of ordinary skill in the art that although some embodiments of the present invention have been described with reference to thin file transistor (TNT) display sub-pixel layouts, various other sub-pixel display layouts can be used for embodiments of 3D displays without loss of generality.

Figure 12A:
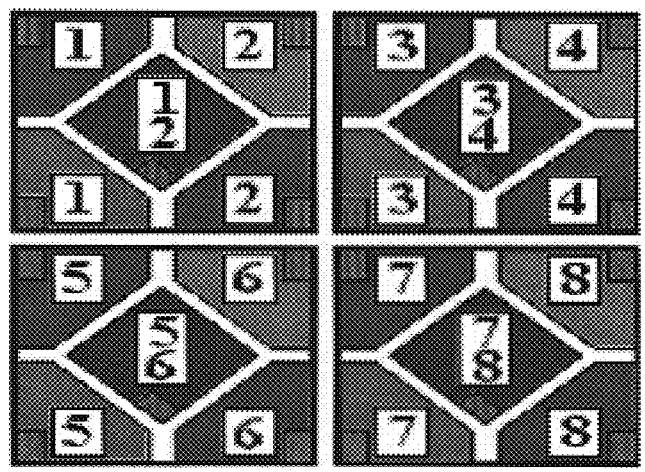
FIGS. 12A and 12B illustrate exemplary PenTile Matrix lenticular layout and Bayer pattern lenticular layout.
Figure 12B:
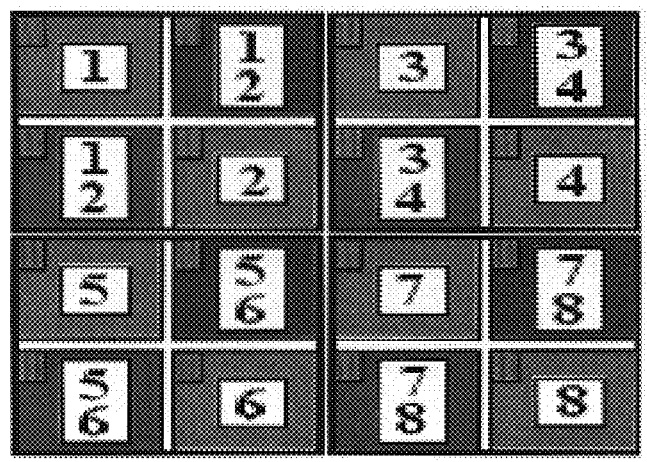

FIGS. 12A and 12B illustrate exemplary PenTile Matrix lenticular layout and Bayer pattern lenticular layout, in which the blue signal is shared between two fields of view.

Figure 13:
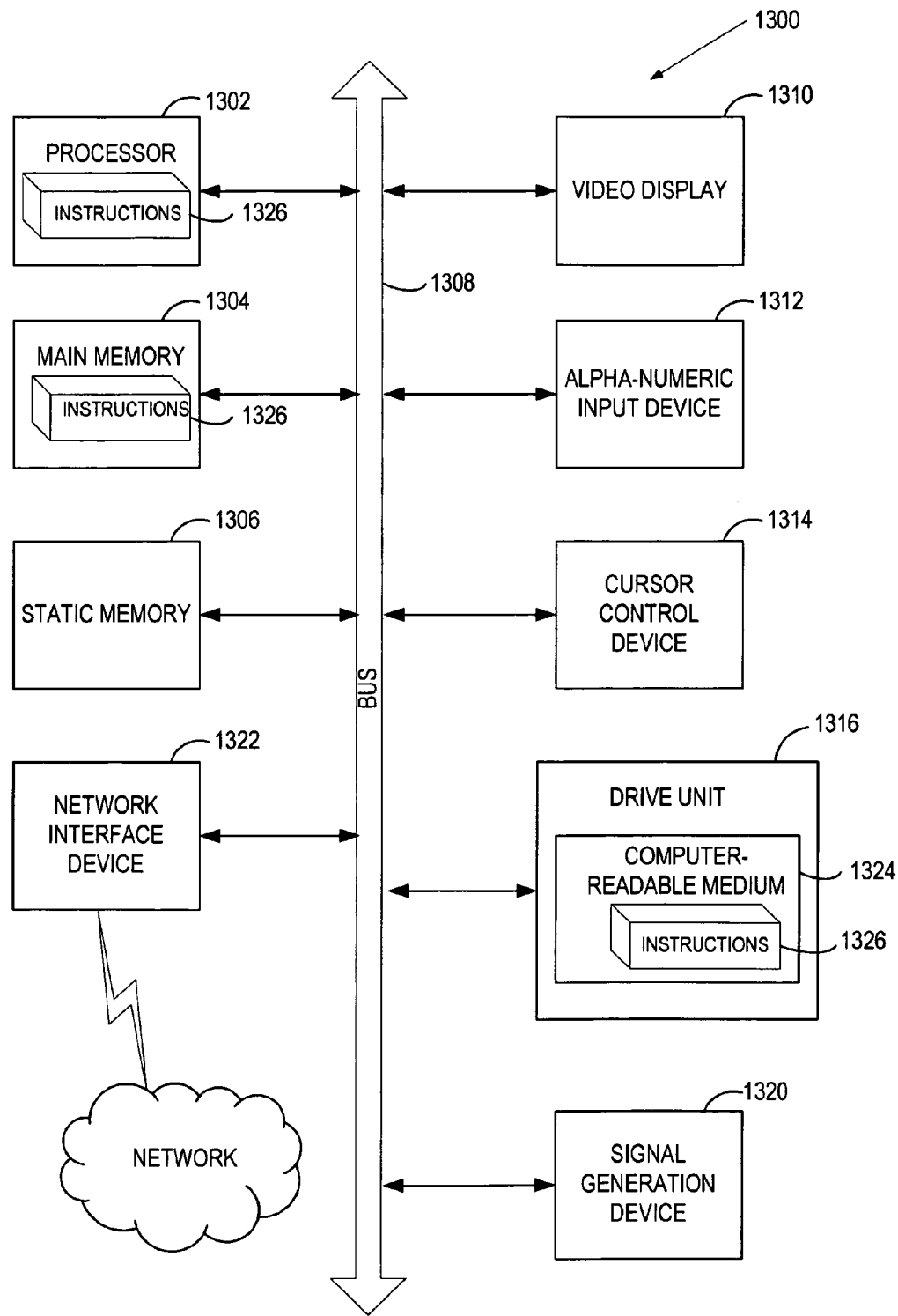
FIG. 13 is a block diagram of a computer environment suitable for practicing embodiments of the present invention.

FIG. 13 is a block diagram of an exemplary computer system 1300 (e.g., a computer system hosting the image processor 202 of FIG. 2) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1300 includes a processor 1302, a main memory 1304 and a static memory 1306, which communicate with each other via a bus 1508. The computer system 1300 may further include a video display unit 1310 (e.g., a liquid crystal display (LCD) or a cathode ray tube (CRT)). The computer system 1300 also includes an alpha-numeric input device 1312 (e.g., a keyboard), a cursor control device 1314 (e.g., a mouse), a disk drive unit 1316, a signal generation device 1320 (e.g., a speaker) and a network interface device 1322.

The disk drive unit 1316 includes a computer-readable medium 1324 on which is stored a set of instructions (i.e., software) 1326 embodying any one, or all, of the methodologies described above. The software 1326 is also shown to reside, completely or at least partially, within the main memory 1304 and/or within the processor 1302. The software 1326 may further be transmitted or received via the network interface device 1322. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A three-dimensional (3D) display sub-pixel rendering method comprising:

receiving 3D image data associated with a number (N) of two-dimensional (2D) images of a scene, the N images having a plurality of corresponding pixel sets, each set in the plurality of corresponding pixel sets including N pixels, each of the N pixels in the set being from a distinct one of the N images and having a green sub-pixel, a red sub-pixel and a blue sub-pixel, and wherein N is an integer greater than one; and for each selected set of corresponding pixels from the N images, mapping N green sub-pixels, N red sub-pixels and N blue sub-pixels to a number (M) of sub-pixels on a display to form a stereogram of the scene, the mapping comprising mapping the N green sub-pixels from the N images to N distinct green sub-pixels on the display, mapping the N red sub-pixels from the N images to a number (L) of distinct red sub-pixels on the display, L is at least one and not exceeding N, and mapping the N blue sub-pixels from the N images to a number (K) of distinct blue sub-pixels on the display, K is at least one and being smaller than N.

2. The method of claim 1 further comprising:

dividing the N blue sub-pixels from the N images into K groups, each of the K groups having two or more of the N blue sub-pixels; and processing each of the K groups to provide a blue signal for a corresponding one of the K blue sub-pixels on the display.

3. The method of claim 2 wherein processing each of the K groups comprises selecting one blue sub-pixel from the group for mapping to the corresponding one of the K blue sub-pixels on the display.

4. The method of claim 2 wherein processing each of the K groups comprises providing a blurred blue sub-pixel channel for the group.

5. The method of claim 1 wherein resulting green and red sub-pixels on the display are covered with one or more lenticules of a lenticular mask overlaying the display, each of the one or more lenticules directing covered sub-pixels into N fields of view.

6. The method of claim 1 wherein:

L is equal to N;

each of the L distinct red sub-pixels is positioned on the display immediately below a corresponding one of the N distinct green sub-pixels to form N pairs of green and red sub-pixels; and the K blue sub-pixels are positioned immediately below first K pairs of the N pairs of green and red sub-pixels.

7. The method of claim 6 wherein:

the N pairs of green and red sub-pixels are covered with a first lenticule of a lenticular mask, the first lenticule directing the N pairs of green and red sub-pixels into N fields of view; and the K blue sub-pixels are covered wit a second lenticule of the lenticular mask, the second lenticule directing the K blue sub-pixels into N fields of view.

8. The method of claim 1 wherein:

L is equal to N;

each of the L distinct red sub-pixels is positioned on the display next to a corresponding one of the N distinct green sub-pixels in a tile pattern to form N pairs of green and red sub-pixels;

K is equal to 1; and the K blue sub-pixels represent a single blue sub-pixel.

9. The method of claim 8 wherein:

each of the N pairs of green and red sub-pixels is covered with a corresponding lenticule of a lenticular mask, the corresponding lenticule directing each of the N pairs of green and red sub-pixels into one of N fields of view.

10. The method of claim 8 wherein the single blue sub-pixel pixel on the display contains overlapped blue channels corresponding to the N blue sub-pixels from the N images.

11. The method of claim 1 wherein:

L is smaller than N;

the L distinct red sub-pixels are positioned on the display below L green sub-pixels of the N distinct green sub-pixels;

K is equal to 1; and the K blue sub-pixels represent a single blue sub-pixel.

12. The method of claim 11 further comprising:

dividing the N red sub-pixels from the N images into L groups, each of the L groups having two or more of the N red sub-pixels; and processing each of the L groups to provide a red signal for a corresponding one of the L red sub-pixels on the display.

13. The method of claim 12 wherein processing each of the L groups comprises selecting one red sub-pixel from the group for mapping to the corresponding one of the L red sub-pixels on the display.

14. The method of claim 12 wherein processing each of the L groups comprises providing a blurred red sub-pixel channel for the group.

15. The method of claim 11 wherein the single blue sub-pixel pixel on the display contains overlapped blue channels corresponding to the N blue sub-pixels from the N images.

16. The method of claim 11 wherein:
   the N green sub-pixels are covered with a first lenticule of a lenticular mask, the first lenticule directing the N green sub-pixels into N fields of view; and
   the L red sub-pixels are covered with a second lenticule of the lenticular mask, the second lenticule directing the L red sub-pixels into N fields of view.

17. The method of claim 11 wherein:
   each of the N green sub-pixels is covered with a corresponding lenticule of a lenticular mask, the corresponding lenticule directing said each of the N green sub-pixels into one of N fields of view; and
   the L red sub-pixels are covered with a second lenticule of the lenticular mask, the second lenticule directing the L red sub-pixels into N fields of view.

18. A three-dimensional (3D) display sub-pixel rendering method comprising:
   receiving input image data associated with a number (N) of images of a scene, the N images having a plurality of corresponding pixel sets, each set in the plurality of corresponding pixel sets including N pixels, each of the N pixels in the set being from a distinct one of the N images and having a first color sub-pixel, a second color sub-pixel and a third color sub-pixel, and wherein N is an integer greater than one;
   for each selected set of corresponding pixels from the N images, producing N grayscale sub-pixels, each of the N grayscale sub-pixels being produced using a first color sub-pixel of a corresponding pixel in the selected set, a second color sub-pixel of the corresponding pixel in the selected set, and a third color sub-pixel from the corresponding set; and
   mapping the N grayscale sub-pixels and N sub-pixels of each color from the selected set to a number (M) of sub-pixels on a display to form a stereogram of the scene, the mapping comprising
      mapping the N grayscale sub-pixels produced for the selected set to N distinct grayscale sub-pixels on the display,
      mapping N processed first color sub-pixels from the selected set to one or more first color sub-pixels on the display,
      mapping N processed second color sub-pixels from the selected set to one or more second color sub-pixels on the display, and
      mapping N processed third color sub-pixels from the selected set to one or more third color sub-pixels on the display.

19. The method of claim 18 wherein the N distinct grayscale sub-pixels on the display are covered with a lenticule of a lenticular mask overlaying the display, the lenticule directing the N distinct grayscale sub-pixels into N fields of view.

20. The method of claim 18 wherein each of the N distinct grayscale sub-pixels on the display is covered with a corresponding lenticule of a lenticular mask overlaying the display, the corresponding lenticule directing said each of the N distinct grayscale sub-pixels into one of N fields of view.

21. A three-dimensional (3D) display comprising:
   a color filter array having a layout represented by a plurality of sub-pixel groups, each of the plurality of sub-pixel groups including a number (N) of green sub-pixels, a number (L) of red sub-pixels and a number (K) of blue sub-pixels,
   each of the K blue sub-pixels corresponds to two or more of N green sub-pixels from N images,
   wherein N is an integer greater than one and K is at least one and is smaller than N,
   L is equal to N, and
   in said each of the plurality of sub-pixel groups, each of the L red sub-pixels is positioned immediately below a corresponding one of the N green sub-pixels to form N pairs of green and red sub-pixels, and the K blue sub-pixels are positioned immediately below first K pairs of the N pairs of green and red sub-pixels.

22. The display of claim 21 wherein the N green sub-pixels and L red sub-pixels on the display are covered with one or more lenticules of a lenticular mask overlaying the display, each of the one or more lenticules directing the covered sub-pixels into N fields of view.

23. The display of claim 21 wherein:
   each of the K blue sub-pixels is associated with a blue sub-pixel channel blurred to cover the two or more of N blue sub-pixels.

24. The display of claim 21 wherein:
   the N pairs of green and red sub-pixels are covered with a first lenticule of a lenticular mask, the first lenticule directing the N pairs of green and red sub-pixels into N fields of view; and
   the K blue sub-pixels are covered with a second lenticule of the lenticular mask, the second lenticule directing the K blue sub-pixels into N fields of view.

25. A three-dimensional (3D) display comprising:
   a color filter array having a layout represented by a plurality of sub-pixel groups, each of the plurality of sub-pixel groups including a number (N) of green sub-pixels, a number (L) of red sub-pixels and a number (K) of blue sub-pixels,
   each of the K blue sub-pixels corresponds to two or more of N green sub-pixels from N images,
   wherein N is an integer greater than one,
   L is equal to N,
   K is equal to 1,
   the K blue sub-pixels represent a single blue sub-pixel, and
   in said each of the plurality of sub-pixel groups, each of the L red sub-pixels is positioned next to a corresponding one of the N green sub-pixels in a tile pattern to form N pairs of green and red sub-pixels.

26. The display of claim 25 wherein:
   each of the N pairs of green and red sub-pixels is covered with a corresponding lenticule of a lenticular mask, the corresponding lenticule directing each of the N pairs of green and red sub-pixels into one of N fields of view.

27. The display of claim 25 wherein the single blue sub-pixel pixel contains overlapped blue channels corresponding to N blue sub-pixels from N images.

28. A three-dimensional (3D) display comprising:
   a color filter array having a layout represented by a plurality of sub-pixel groups, each of the plurality of sub-pixel groups including a number (N) of green sub-pixels, a number (L) of red sub-pixels and a number (K) of blue sub-pixels,
   each of the K blue sub-pixels corresponds to two or more of N green sub-pixels from N images,
   wherein N is an integer greater than one,
   L is less than N,
   K is equal to 1,
   the K blue sub-pixels represent a single blue sub-pixel, and
   in said each of the plurality of sub-pixel groups, the L red sub-pixels are positioned immediately below L green sub-pixels of the N green sub-pixels.

29. The display of claim 28 wherein:
each of the L red sub-pixels corresponds to two or more of N red sub-pixels from N images and is associated with a red sub-pixel channel blurred to cover the two or more of N red sub-pixels.

30. The display of claim 28 wherein the single blue sub-pixel pixel contains overlapped blue channels corresponding to N blue sub-pixels from N images.

31. The display of claim 28 wherein:
the N green sub-pixels are covered with a first lenticule of a lenticular mask, the first lenticule directing the N green sub-pixels into N fields of view; and
the L red sub-pixels are covered with a second lenticule of the lenticular mask, the second lenticule directing the L red sub-pixels into N fields of view.

32. The display of claim 28 wherein:
each of the N green sub-pixels is covered with a corresponding lenticule of a lenticular mask, the corresponding lenticule directing said each of the N green sub-pixels into one of N fields of view; and
the L red sub-pixels are covered with a second lenticule of the lenticular mask, the second lenticule directing the L red sub-pixels into N fields of view.

33. A lenticular mask overlaying a display, the lenticular mask comprising:
a plurality of lenticules covering a plurality of sub-pixels on the display to direct display signals into a plurality of fields of view at a sub-pixel level, wherein one of the plurality of lenticules covers a set of sub-pixels of first identical colors to direct the set into the plurality of fields of view and a number of the plurality of fields of view is greater than a number of sub-pixels in the set.

34. The mask of claim 33 wherein the display signals are selected from the group consisting of luminance signals and chrominance signals.

35. The mask of claim 33 wherein one of the plurality of lenticules covers one of the plurality of sub-pixels to direct said one of the plurality of sub-pixels into one of the plurality of fields of view, said one of the plurality of sub-pixels being any one of a grayscale sub-pixel and a color sub-pixel.

36. The mask of claim 33 wherein the number of the plurality of fields of view is greater than the number of sub-pixels in the set.

37. The mask of claim 33 wherein one of the plurality of lenticules covers a set of pairs of color sub-pixels to direct the set into the plurality of fields of view, each pair consisting of a first identical colors sub-pixel and a second identical colors sub-pixel.

38. The mask of claim 33 wherein one of the plurality of lenticules covers a pair of color sub-pixels to direct the pair into one of the plurality of fields of view, the pair consisting of a first identical colors sub-pixel and a second identical colors sub-pixel.

39. The mask of claim 33 wherein one of the plurality of lenticules covers a set of grayscale sub-pixels to direct the set into the plurality of fields of view.

40. A computer readable medium that provides instructions, which when executed on a processor cause the processor to perform a method comprising:
receiving three-dimensional (3D) image data associated with a number (N) of two-dimensional (2D) images of a scene, the N images having a plurality of corresponding pixel sets, each set in the plurality of corresponding pixel sets including N pixels, each of the N pixels in the set being from a distinct one of the N images and having a green sub-pixel, a red sub-pixel and a blue sub-pixel, and wherein N is an integer greater than one; and
for each selected set of corresponding pixels from the N images, mapping N green sub-pixels, N red sub-pixels and N blue sub-pixels to a number (M) of sub-pixels on a display to form a stereogram of the scene, the mapping comprising
mapping the N green sub-pixels from the N images to N distinct green sub-pixels on the display,
mapping the N red sub-pixels from the N images to a number (L) of distinct red sub-pixels on the display, L is at least one and not exceeding N, and
mapping the N blue sub-pixels from the N images to a number (K) of distinct blue sub-pixels on the display, K is at least one and being smaller than N.

41. A computer readable medium that provides instructions, which when executed on a processor cause the processor to perform a method comprising:
receiving three-dimensional (3D) input image data associated with a number (N) of two-dimensional (2D) images of a scene, the N images having a plurality of corresponding pixel sets, each set in the plurality of corresponding pixel sets including N pixels, each of the N pixels in the set being from a distinct one of the N images and having a first color sub-pixel, a second color sub-pixel and a third color sub-pixel, and wherein N is an integer greater than one;
for each selected set of corresponding pixels from the N images, producing N grayscale sub-pixels, each of the N grayscale sub-pixels being produced using a first color sub-pixel of a corresponding pixel in the selected set, a second color sub-pixel of the corresponding pixel in the selected set, and a third color sub-pixel from the corresponding set; and
mapping the N grayscale sub-pixels and N sub-pixels of each color from the selected set to a number (M) of sub-pixels on a display to form a stereogram of the scene, the mapping comprising
mapping the N grayscale sub-pixels produced for the selected set to N distinct grayscale sub-pixels on the display,
mapping N processed first color sub-pixels from the selected set to one or more first color sub-pixels on the display,
mapping N processed second color sub-pixels from the selected set to one or more second color sub-pixels on the display, and
mapping N processed third color sub-pixels from the selected set to one or more third color sub-pixels on the display.

42. A computerized system comprising:
a memory; and
at least one processor coupled to the memory, the at least one processor executing a set of instructions which cause the at least one processor to
receive three-dimensional (3D) image data associated with a number (N) of two-dimensional (2D) images of a scene, the N images having a plurality of corresponding pixel sets, each set in the plurality of corresponding pixel sets including N pixels, each of the N pixels in the set being from a distinct one of the N images and having a green sub-pixel, a red sub-pixel and a blue sub-pixel, and wherein N is an integer greater than one, and
map, for each selected set of corresponding pixels from the N images, N green sub-pixels, N red sub-pixels and N blue sub-pixels to a number (M) of sub-pixels on a display to form a stereogram of the scene, the mapping comprising mapping the N green sub-pixels from the N images to N distinct green sub-pixels on the display, mapping the N red sub-pixels from the N images to a number (L) of distinct red sub-pixels on the display, L is at least one and not exceeding N, and mapping the N blue sub-pixels from the N images to a number (K) of distinct blue sub-pixels on the display, K is at least one and being smaller than N.

43. A computerized system comprising:

a memory; and at least one processor coupled to the memory, the at least one processor executing a set of instructions which cause the at least one processor to receive three-dimensional (3D) input image data associated with a number (N) of two-dimensional (2D) images of a scene, the N images having a plurality of corresponding pixel sets, each set in the plurality of corresponding pixel sets including N pixels, each of the N pixels in the set being from a distinct one of the N images and having a first color sub-pixel, a second color sub-pixel and a third color sub-pixel, and wherein N is an integer greater than one;

for each selected set of corresponding pixels from the N images, produce N grayscale sub-pixels, each of the N grayscale sub-pixels being produced using a first color sub-pixel of a corresponding pixel in the selected set, a second color sub-pixel of the corresponding pixel in the selected set, and a third color sub-pixel from the corresponding set; and map the N grayscale sub-pixels and N sub-pixels of each color from the selected set to M sub-pixels on a display to form a stereogram of the scene, the mapping comprising mapping the N grayscale sub-pixels produced for the selected set to N distinct grayscale sub-pixels on the display, mapping N processed first color sub-pixels from the selected set to one or more first color sub-pixels on the display, mapping N processed second color sub-pixels from the selected set to one or more second color sub-pixels on the display, and mapping N processed third color sub-pixels from the selected set to one or more third color sub-pixels on the display.

44. An apparatus comprising:

means for receiving three-dimensional (3D) image data associated with a number (N) of two-dimensional (2D) images of a scene, the N images having a plurality of corresponding pixel sets, each set in the plurality of corresponding pixel sets including N pixels, each of the N pixels in the set being from a distinct one of the N images and having a green sub-pixel, a red sub-pixel and a blue sub-pixel, and wherein N is an integer greater than one; and means for mapping, for each selected set of corresponding pixels from the N images, N green sub-pixels, N red sub-pixels and N blue sub-pixels to a number (M) of sub-pixels on a display to form a stereogram of the scene, the means for mapping comprising means for mapping the N green sub-pixels from the N images to N distinct green sub-pixels on the display, means for mapping the N red sub-pixels from the N images to a number(L) of distinct red sub-pixels on the display, L is at least one and not exceeding N, and means for mapping the N blue sub-pixels from the N images to a number (K) of distinct blue sub-pixels on the display, K is at least one and being smaller than N.

45. An apparatus comprising:

means for receiving three-dimensional (3D) input image data associated with a number (N) of two-dimensional (2D) images of a scene, the N images having a plurality of corresponding pixel sets, each set in the plurality of corresponding pixel sets including N pixels, each of the N pixels in the set being from a distinct one of the N images and having a first color sub-pixel, a second color sub-pixel and a third color sub-pixel, and wherein N is an integer greater than one;

means for producing, for each selected set of corresponding pixels from the N images, N grayscale sub-pixels, each of the N grayscale sub-pixels being produced using a first color sub-pixel of a corresponding pixel in the selected set, a second color sub-pixel of the corresponding pixel in the selected set, and a third color sub-pixel from the corresponding set; and means for mapping the N grayscale sub-pixels and N sub-pixels of each color from the selected set to a number (M) of sub-pixels on a display to form a stereogram of the scene, the mapping comprising means for mapping the N grayscale sub-pixels produced for the selected set to N distinct grayscale sub-pixels on the display, means for mapping N processed first color sub-pixels from the selected set to one or more first color sub-pixels on the display, means for mapping N processed second color sub-pixels from the selected set to one or more second color sub-pixels on the display, and means for mapping N processed third color sub-pixels from the selected set to one or more third color sub-pixels on the display.

46. The display of claim 25 wherein the N green sub-pixels and L red sub-pixels on the display are covered with one or more lenticules of a lenticular mask overlaying the display, each of the one or more lenticules directing the covered sub-pixels into N fields of view.

47. The display of claim 25 wherein:

each of the K blue sub-pixels is associated with a blue sub-pixel channel blurred to cover the two or more of N blue sub-pixels.

48. The display of claim 28 wherein the N green sub-pixels and L red sub-pixels on the display are covered with one or more lenticules of a lenticular mask overlaying the display, each of the one or more lenticules directing the covered sub-pixels into N fields of view.

49. The display of claim 28 wherein:

each of the K blue sub-pixels is associated with a blue sub-pixel channel blurred to cover the two or more of N blue sub-pixels.

* * * * *